United States Patent
McManus et al.

(10) Patent No.: US 6,575,514 B2
(45) Date of Patent: Jun. 10, 2003

(54) HYDRAULIC SYNCHRONIZER MECHANISM FOR A SLIDE-OUT ROOM

(75) Inventors: Patrick W. McManus, Osceola, IN (US); Martin P. McManus, Mishawaka, IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/909,086

(22) Filed: Jul. 19, 2001

(65) Prior Publication Data

US 2002/0060467 A1 May 23, 2002

Related U.S. Application Data

(60) Provisional application No. 60/252,567, filed on Nov. 22, 2000.

(51) Int. Cl.⁷ .................................................. B60P 3/34
(52) U.S. Cl. .................... 296/26.01; 296/165; 296/171; 296/175
(58) Field of Search ............................ 296/26.01, 26.12, 296/26.13, 171, 172, 173, 175, 176, 165

(56) References Cited

U.S. PATENT DOCUMENTS

| | | |
|---|---|---|
| 2,704,223 A | 3/1955 | Houdart |
| 2,739,833 A | 3/1956 | Schenkel et al. |
| 2,831,722 A | 4/1958 | Hanson et al. |
| 2,842,972 A | 7/1958 | Houdart |
| 3,070,850 A | 1/1963 | McClure, Sr. |
| 3,719,386 A | 3/1973 | Puckett et al. |
| 3,738,502 A | 6/1973 | Noller |
| 3,882,558 A | 5/1975 | Christensen |
| 4,130,069 A | 12/1978 | Evans et al. |
| 4,277,919 A | 7/1981 | Artweger et al. |
| 4,797,831 A | 1/1989 | Dressing et al. |
| 4,913,458 A | 4/1990 | Hamilton |
| 5,176,391 A | 1/1993 | Schneider et al. |
| 5,237,782 A | 8/1993 | Cooper |
| 5,295,430 A | 3/1994 | Dewald, Jr. et al. |
| 5,320,047 A | 6/1994 | Deurloo et al. |
| 5,332,276 A | 7/1994 | Blodgett, Jr. |
| 5,511,459 A * | 4/1996 | Hanser et al. ................. 91/171 |
| 5,586,802 A | 12/1996 | Dewald, Jr. et al. |
| 5,800,002 A | 9/1998 | Tiedge et al. |
| 5,809,908 A | 9/1998 | Catta et al. |
| 5,829,822 A | 11/1998 | Tiedge |
| 5,833,296 A | 11/1998 | Schneider |
| 5,857,733 A | 1/1999 | Dewald, Jr. et al. |
| 5,902,001 A | 5/1999 | Schneider |
| 5,915,774 A | 6/1999 | Tiedge |
| 6,050,573 A | 4/2000 | Kunz |
| 6,052,952 A | 4/2000 | Frerichs et al. |
| 6,345,854 B1 * | 2/2002 | McManus ................. 296/26.13 |

FOREIGN PATENT DOCUMENTS

| | | |
|---|---|---|
| AU | A-83 439/82 | 11/1982 |
| CA | 2136673 | 3/1996 |

* cited by examiner

Primary Examiner—D. Glenn Dayoan
Assistant Examiner—Hilary Gutman
(74) Attorney, Agent, or Firm—Baker & Daniels

(57) ABSTRACT

A drive mechanism for transportable living quarters having a main living area and a slide-out room includes a plurality of actuators connected between the main living area and the slide-out room to move the room between a retracted position retracted within the main living area and an extended position extended from the main living area, a plurality of position sensors associated with the plurality of actuators, each position sensor outputting a position signal representing a position of its associated actuator, a plurality of valves connected to the plurality of actuators, each valve being adjustable to either enable or inhibit movement of its corresponding actuator, and a controller for adjusting the valves in response to the position signals to synchronize movement of the actuators.

56 Claims, 15 Drawing Sheets

HYDRAULIC SYNCHRONIZER MECHANISM FOR A SLIDE-OUT ROOM

This application claims the benefit of U.S. Provisional Patent Application Ser. No. 60/252,567, filed Nov. 22, 2000, the complete disclosure of which is hereby expressly incorporated by reference.

FIELD OF THE INVENTION

This invention generally relates to slide-out rooms for use with recreational vehicles and more particularly to a mechanism for controlling the actuation of a slide-out room.

BACKGROUND OF THE INVENTION

The widths of transportable living quarters, such as recreational vehicles and towable trailers, are limited by highway regulations. Accordingly, many such recreational vehicles include one or more slide-out rooms that can be retracted into the vehicle during travel, and extended from the vehicle to provide additional living space when the unit is parked for use.

Slide-out rooms are typically supported by telescoping supports which are mounted to the frame of the vehicle and actuated by hydraulic rams, electric motors, or similar actuation devices. Typically, two or more such actuation devices are employed, but smaller rooms may use only a single actuation device. Since these actuation devices are often mounted to accommodate wheel wells and other structural components of the vehicle, they may not be symmetrically located with respect to the slide-out room. This may cause unequal loading of the actuation devices, resulting in unsynchronized travel of the room. Additionally, actuation devices may operate at different speeds, even under equal loading. Failure to properly synchronize the motion of the actuation devices may cause undesirable deflection across the length of the room resulting in damage to the room or the vehicle, incomplete seals against weather about the perimeter of the room, and an unsightly appearance of the room. Accordingly, it is desirable to synchronize the operation of the actuation devices to avoid such difficulties. Moreover, it is desirable to calibrate and control the "room out" and "room in" positions of the actuation devices to assure that the room is fully extended across its entire length when the room is extended for use, and fully retracted across its entire length when the room is retracted for travel.

SUMMARY OF THE INVENTION

The present invention provides a hydraulic synchronizer mechanism for a slide-out room that includes a pair of extendable supports that are actuated by a pair of hydraulic actuators or cylinders. Extension or retraction of the hydraulic actuators causes extension or retraction of the extendable supports, thereby moving the room between the extended and retracted positions. Although the invention is described in connection with a pair of hydraulic actuators, the teachings of the invention are equally applicable to actuation systems having three or more hydraulic actuators. Also, while the extendable supports are described herein as mounted to the framework of the vehicle below the vehicle floor, it should be understood that the hydraulic synchronizer of the present invention may readily be adapted by one of ordinary skill in the art to synchronize the movement of extendable members mounted within the vehicle floor or above the vehicle floor.

The present invention further provides a controller which monitors the movement of each hydraulic actuator, and temporarily interrupts the operation of the leading actuator to ensure that both actuators move in unison. The synchronizer may further include sensors or stops to indicate the relative movement of each actuator, and to establish stop limits to set the "room out" and "room in" positions of the slide-out room.

These and other features of the present invention will become apparent and the invention will be better understood from the following description, with reference to the accompanying drawings.

DETAILED DESCRIPTION OF EMBODIMENTS OF THE INVENTION

Figure 1:
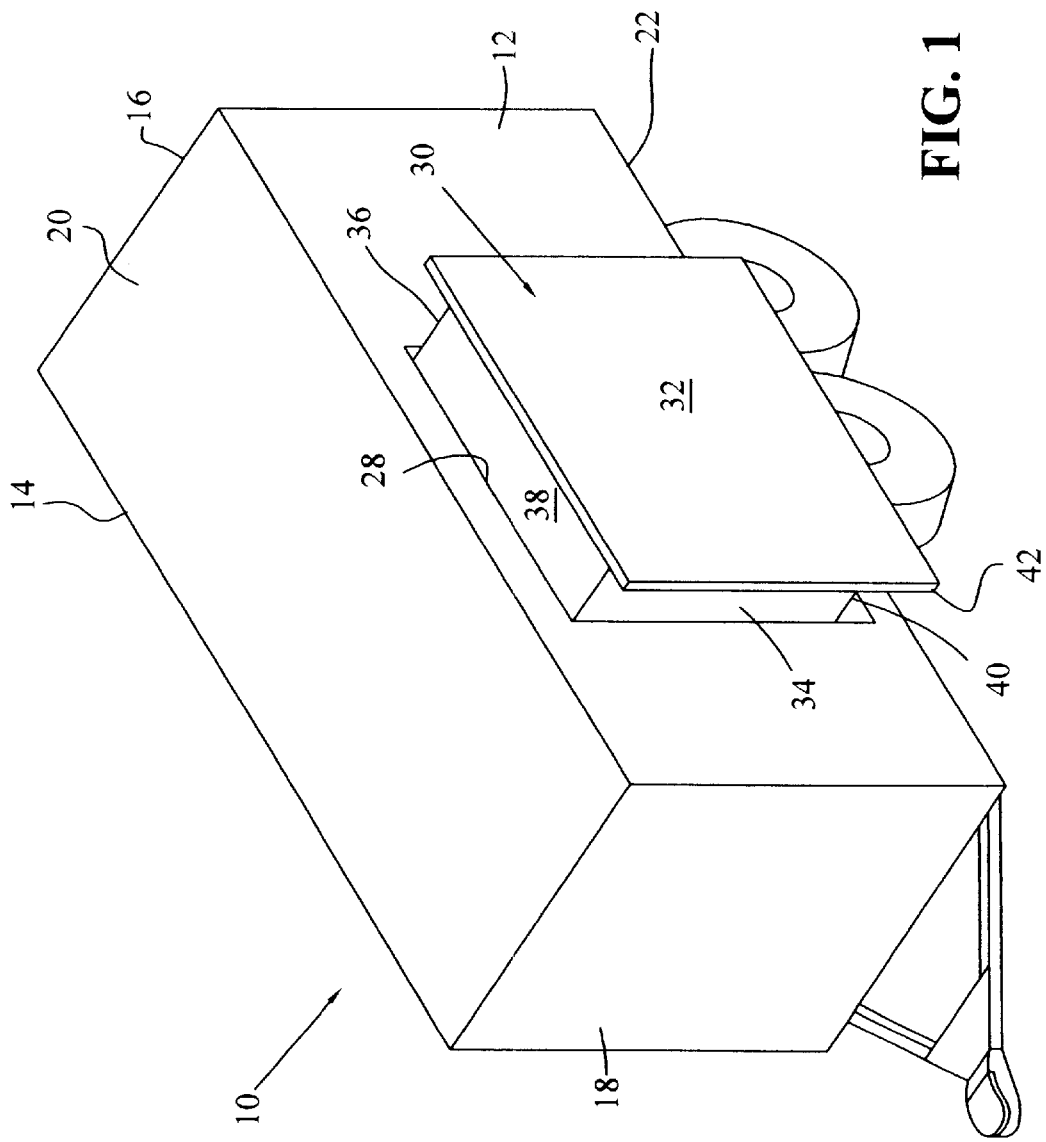
FIG. 1 is a perspective view of a vehicle incorporating a slide-out room.

For the purposes of promoting an understanding of the principles of the invention, reference will now be made to the embodiments illustrated in the drawings. It should be understood that no limitation of the scope of the invention is intended by these descriptions. The invention includes any alterations and further modifications in the illustrated devices and described methods and further applications of the principles of the invention which would normally occur to one skilled in the art to which the invention relates.

Figure 2:
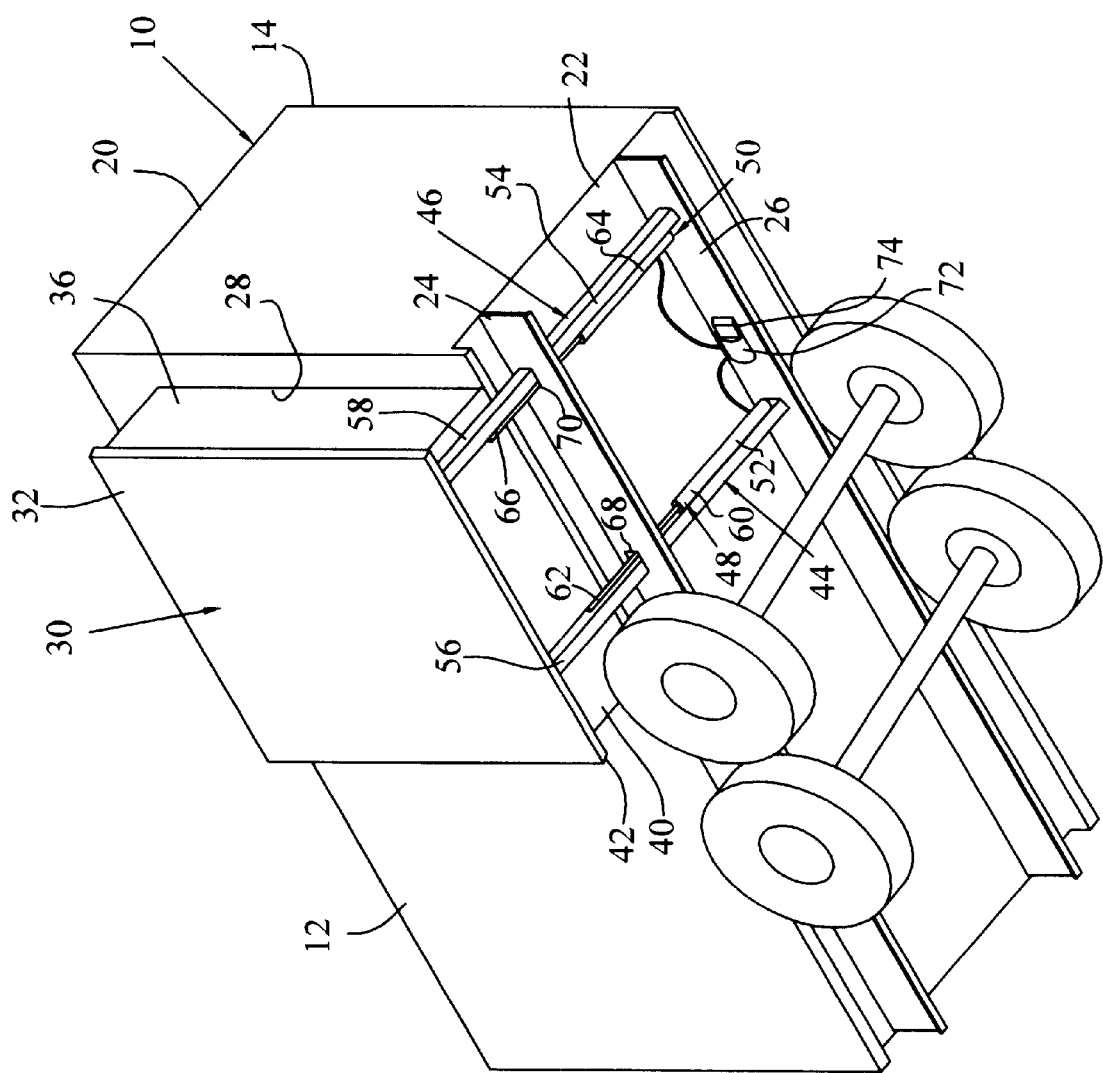
FIG. 2 is another perspective view of the vehicle of FIG. 1.

Referring now to FIGS. 1 and 2, a mobile living quarters or vehicle 10, such as a recreational vehicle, generally includes a pair of side walls 12, 14, a pair of end walls 16, 18, a ceiling 20, and a floor 22 (FIG. 2) which is supported on a frame including a pair of longitudinally extending frame members 24, 26. Side wall 12 of vehicle 10 includes a large opening 28 which receives a slide-out room generally indicated by the numeral 30 mounted for movement relative to side wall 12 between an extended position (FIGS. 1 and 2) to provide additional living space, and a retracted position, retracted within vehicle 10 to permit vehicle 10 to be moved to a different location.

Room 30 generally includes a back wall 32 which is substantially flush with side wall 12 of vehicle 10 when room 30 is in the retracted position. Room 30 also includes a pair of side walls 34, 36, a ceiling 38, a floor 40, and a fascia 42 which extends horizontally beyond side walls 34, 36, and vertically beyond ceiling 38 and floor 40. A bead seal (not shown) is mounted to fascia 42 and is compressed between fascia 42 and vehicle side wall 12 when room 30 is moved into the retracted position.

Referring now to FIG. 2, room 30 is supported during movement between the extended and retracted positions by a pair of extendable supports or members 44, 46 which are driven by a corresponding pair of hydraulic actuators 48, 50. In one embodiment of the invention, supports 44, 46 each include an outer tube or support 52, 54 mounted to frame members 24, 26 and an inner tube or support 56, 58 connected to room 30 and mounted for telescopic movement within outer tubes 52, 54, respectively. Actuator 48 generally includes a cylinder 60 which is mounted to outer support 52 and a telescoping piston 62 which is connected to inner support 56. Similarly, actuator 50 includes a cylinder 64 which is mounted to outer support 54 and telescoping piston 66 which is connected to inner support 58. As shown, inner support 56 and piston 62 extend through an opening 68 of frame member 24, and inner support 58 and piston 66 extend through an opening 70 in frame member 24. Hydraulic fluid is supplied to actuators 44, 46 by a pump 72 driven by an electric motor 74.

Figure 3:
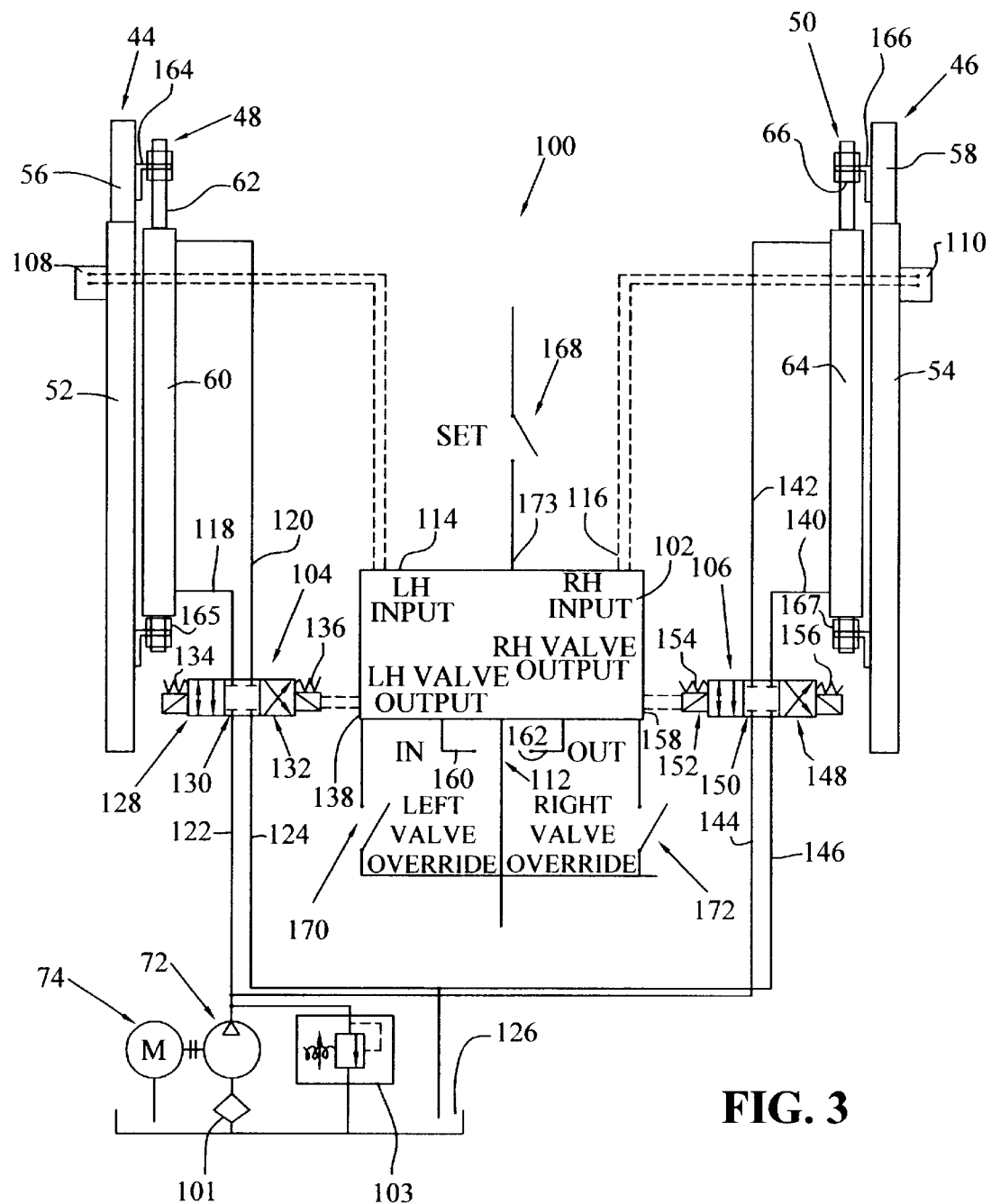
FIG. 3 is a schematic diagram of a synchronizer according to the present invention.

Referring now to FIG. 3, a synchronizer 100 according to the present invention generally includes a controller 102, a pair of valves 104, 106 corresponding to actuators 48, 50, respectively, a pair of sensors 108, 110 corresponding to supports 44, 46, respectively, and a control switch 112. Controller 102 includes a left hand input 114 which is connected to sensor 108 and a right hand input 116 which is connected to sensor 110. Valve 104 is controllably connected to a first hydraulic line 118 which is connected to the rear chamber of cylinder 60 to drive piston rod 62 outwardly, a second hydraulic line 120 which is connected to the forward chamber of cylinder 60 to drive piston rod 62 inwardly, a third hydraulic line 122 which is connected to pump 72, and a fourth hydraulic line 124 which is connected to a reservoir 126. Valve 104 includes a first section 128, a second section 130, and a third section 132. Valve 104 is biased by springs 134, 136 toward the center position shown in FIG. 3, wherein second section 130 restricts fluid flow between line 122 and line 118, and line 124 and line 120.

Controller 102 controls the position of valve 104 through left-hand valve output 138. When valve 104 is moved to the right as viewed in FIG. 3, first section 128 connects line 122 to line 118 and line 120 to line 124. Accordingly, fluid may be pumped from pump 72 through section 128 into the rear chamber of cylinder 60, causing piston rod 62 to move outwardly. Simultaneously, fluid is released from the forward chamber of cylinder 60 through line 120 and section 128 of valve 104 to reservoir 126. Similarly, when valve 104 is moved to the left as viewed in FIG. 3, section 132 connects pump 72 to the forward chamber of cylinder 60, and the rear chamber of cylinder 60 to reservoir 126. Accordingly, as fluid is pumped into forward chamber of cylinder 60, piston 62 is retracted and fluid is released from the rear chamber of cylinder 60 to reservoir 126. Use of a three-position valve in the manner described above permits use of a uni-directional pump for pump 72. As will be further described below, however, a bi-directional pump may also be used with two-position valves.

Valve 106 is controllably connected to cylinder 64 by hydraulic lines 140, 142, and to pump 72 and reservoir 126 by lines 144, 146, in a manner similar to that described above. Valve 106 includes a first section 148, a second section 150, a third section 152, and a pair of springs 154, 156 to bias valve 106 into the position shown in FIG. 3. Like valve 104, valve 106 may be moved to any one of three positions by controller 102 through right hand valve output 158. First section 148 facilitates extension of piston 66 and third section 152 facilitates retraction of piston 66.

The plumbing associated with synchronizer 100 further includes a filter 101 connected between reservoir 126 and the input to pump 72, and a relief valve 103. As is well known in the art, relief valve 103 (connected between the outlet of pump 72 and reservoir 126) may be set to automatically direct fluid output from pump 72 to reservoir 126 when the output pressure of pump 72 exceeds the relief valve setting.

Control switch 112 may be a three-position switch which provides an "IN" signal to controller 102 when in contact with "IN" terminal 160, and an "OUT" signal to controller 102 when in contact with "OUT" terminal 162. Synchronizer 100 also includes a set switch 168, a left valve override switch 170, and a right valve override switch 172. The purpose and operation of switches 168, 170, 172 will be further described below in the discussion of initialization of synchronizer 100.

In its most basic form, a synchronizer according to the present invention operates in the manner described below. A user moves control switch 112 to contact "IN" terminal 160, for example, to retract room 30 into vehicle 10. This provides an "IN" signal to controller 102. Controller 102 outputs a signal on left hand valve output 138 to cause valve 104 to shift to the left such that third segment 132 registers with lines 118, 120, 122, 124. Similarly, controller 102 provides an output on right hand valve output 158 which causes valve 106 to shift to the right such that third segment 152 registers with lines 140, 142, 144, 146. Controller 102 also activates motor 74, which causes pump 72 to pump fluid from reservoir 126 according to principles well known in the art. Fluid is provided from pump 72 through line 122, section 132 of valve 104, and line 120 into the forward chamber of cylinder 60 to retract piston 62. Simultaneously, fluid is provided through line 144, section 152 of valve 106, and line 142 into the forward chamber of cylinder 64, retracting piston 66.

As shown, piston 62 is attached to inner support 56 by bracket 164, and cylinder 60 is attached to outer support 52 by bracket 165. Similarly, piston 66 is attached to inner support 58 by bracket 166, and cylinder 64 is attached to outer support 54 by bracket 167. Accordingly, as pistons 62, 66 are retracted, inner supports 56, 58 are likewise retracted into outer supports 52, 54, respectively. As inner support 56 is retracted into outer support 52, sensor 108 senses the movement or position of inner support 56 (as described in greater detail below) and produces a status signal which is received by controller 102 through left hand input 114 as indicated by the dashed lines in FIG. 3. Similarly, as inner support 58 is retracted into outer support 54, sensor 110 senses the movement or position of inner support 58 and generates a status signal which is received by controller 102 through right hand input 116.

Controller 102 compares the status signals from sensors 108, 110 to determine whether inner supports 56, 68 are moving substantially in unison. If the status signals from sensors 108, 110 are different by more than a predetermined amount, controller 102 shuts off or restricts flow of hydraulic fluid to the leading actuator 48, 50. More specifically, if the status signal from sensor 108 indicates that actuator 48 has overtaken actuator 50 (as indicated by the status signal from sensor 110) during the retraction process, and leads actuator 50 by more than a predetermined difference amount, controller 102 interrupts the signal on left hand valve output 138 to spring valve 104 to the center position as shown in FIG. 3. When valve 104 is in the center position, actuator 48 remains stationary. Eventually, the continued retraction of actuator 50 causes sensor 110 to generate a status signal which is within the predetermined difference limit relative to the status signal from sensor 108. When this occurs, controller 102 provides a signal on left hand valve output 138 to valve 104 to again shift valve 104 to the left as viewed in FIG. 3. Synchronizer 100 continues to synchronize the movement of actuators 48, 50 in the manner described above until room 30 reaches the retracted position. Of course, if control switch 112 is moved to contact "OUT" terminal 162, actuators 48, 50 extend to move room 30 toward the extended position using the synchronization process described above.

Figure 4:
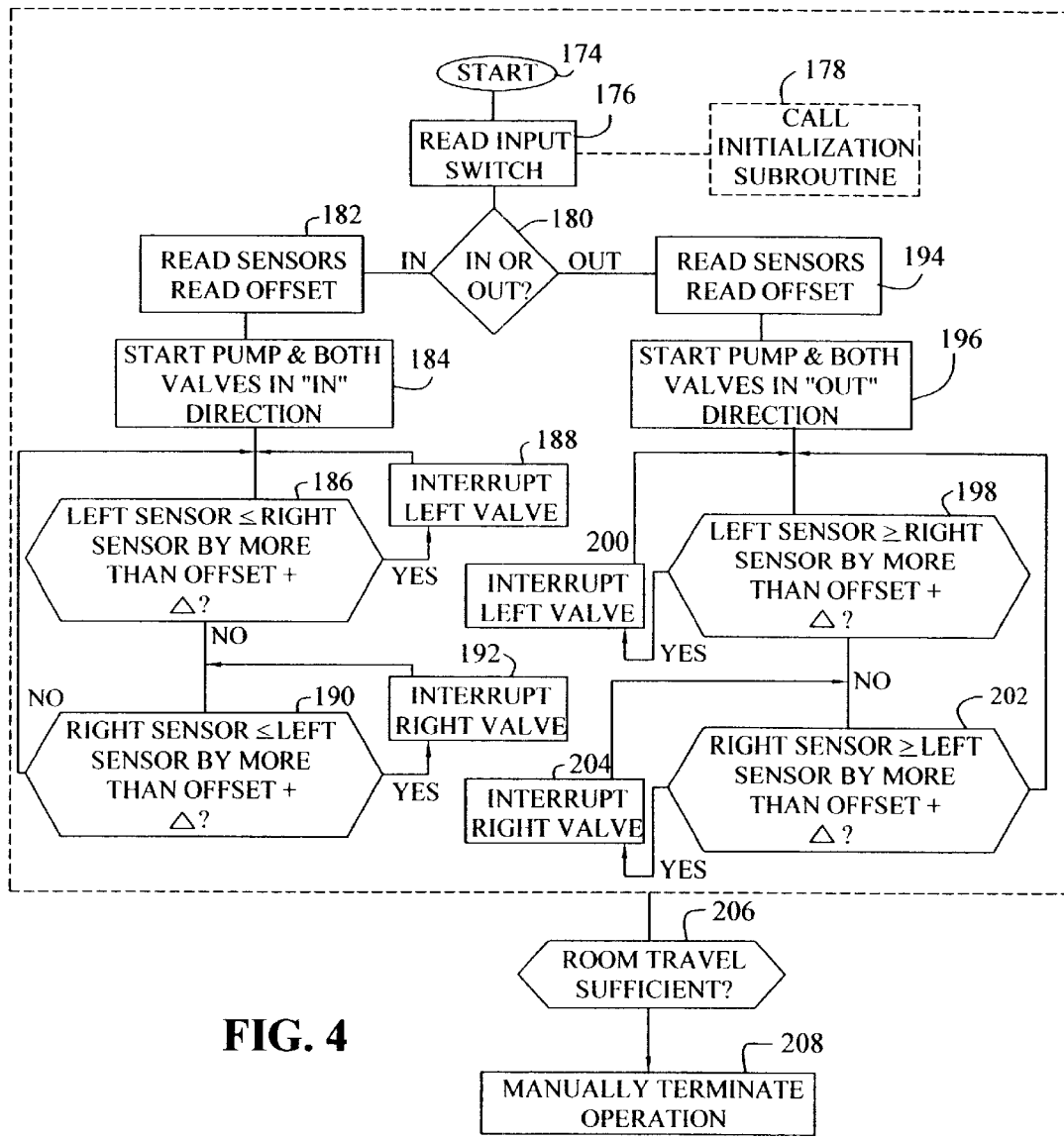
FIG. 4 is a block diagram depicting the operation of the synchronizer of FIG. 3.

A flow chart of the basic operation of synchronizer 100 is shown in FIG. 4. The process begins at start block 174 when an operator actuates control switch 112. At block 176, controller 102 reads the input provided from set switch 168 at controller input 173. As further described below, the position of set switch 168 may prompt controller 102 to execute an initialization subroutine as indicated by block 178 of FIG. 4. Assuming initialization is not desired, controller 102 next reads the inputs at "IN" terminal 160 and "OUT" terminal 162 to determine the position of control switch 112 as indicated at decision block 180. If control switch 112 is moved so as to contact "IN" terminal 160, controller 102 next reads the status signals provided at inputs 114, 116 by sensors 108, 110, respectively.

Additionally, as indicated by block 182, controller 102 reads an offset amount between the status signals previously determined as part of the initialization process described below. This offset establishes an acceptable and pre-planned difference between the positions of actuators 48, 50 (and ultimately extendable supports 44, 46). Because of differences in the mounting locations of extendable supports 44, 46, inaccuracies in the geometry of room 30, and other inaccuracies, sensors 108, 110 will generally not provide identical data when room back wall 32 is parallel with vehicle side wall 12, and an offset between the two status signals will exist (corresponding to the different amount of extension of extendable supports 44, 46).

At block 184, controller 102 starts motor 74 and pump 72 and provides output signals on left hand valve output 138 and right hand valve output 158 to valves 104, 106, respectively, to cause the valves to permit fluid flow into the forward chambers of cylinders 60, 64. At decision block 186, controller 102 compares the status signal from sensor 108 corresponding to left extendable support 44 to the status signal from sensor 110 corresponding to right extendable support 46. If the status signal from sensor 108 is less than the status signal from sensor 110 by an amount greater than the previously read offset amount plus a tolerance, then the operation of left actuator 48 is interrupted as indicated by block 188 in the manner described above to permit right actuator 50 to catch up to left actuator 48. After left valve 104 is moved to interrupt operation of left actuator 48, controller 102 continues to scan and compare the signals through the loop defined by blocks 188 and 186. If the status signal from left sensor 108 is not less than the status signal from right sensor 110 by more than the offset plus a tolerance, then the status signal from right sensor 110 is compared to the status signal of left sensor 108 at decision block 190. If the status signal from right sensor 110 is not less than the status from left sensor 108 by more than the offset plus a tolerance, then the relative position of actuators 48, 50 are compared again at decision block 186. The loop consisting of decision block 186 and decision block 190 is repeated without interruption of left valve 104 or right valve 106, so long as extendable supports 44, 46 move substantially in unison (and have not yet reached the retracted position). It should be apparent from the drawing that at decision block 190, if the status signal from sensor 110 is less than the status signal from sensor 108 by more than the offset plus a tolerance, right valve 106 is interrupted at block 192 and the relationship between extendable supports 44, 46 is again tested at decision block 190.

As should also be apparent from FIG. 4, if controller 102 senses, at decision block 180, that control switch 112 is in the "OUT" position, controller 102 follows a similar procedure depicted by blocks 194, 196, 198, 200, 202, 204. At decision blocks 198, 202, controller 102 tests whether extendable support 44 is extended farther than support 46, and whether support 46 is extended farther than support 44 by more than an offset plus a predetermined tolerance.

Decision block 206 indicates a human determination of whether room 30 has reached the extended or retracted position. If the operator determines that room 30 is sufficiently extended or retracted, the operator may release control switch 112 to terminate operation as indicated at block 208.

Figure 5:
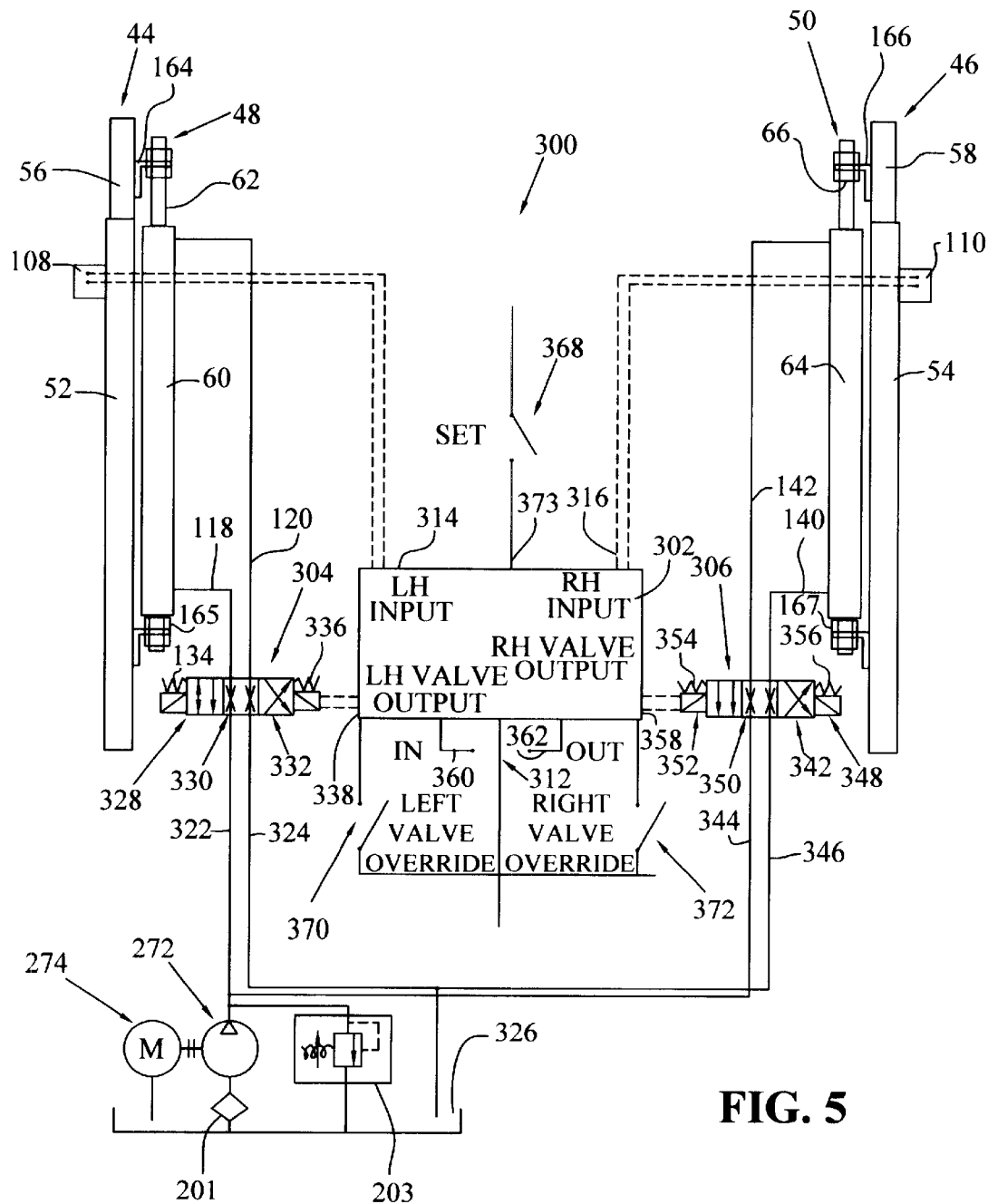
FIG. 5 is a schematic diagram of a variation of the synchronizer of FIG. 3.

Referring now to FIG. 5, synchronizer 300 is substantially similar to synchronizer 100 of FIG. 3. Accordingly, the reference designations of like components have been retained, but increased by 200. Synchronizer 300 differs from synchronizer 100 in that valves 304, 306 either pass or restrict the flow of hydraulic fluid to actuators 48, 50, instead of either passing or preventing such fluid flow. Specifically, valve 304 includes a first section 328, a second section 330, and a third section 332. Like first section 128 of valve 104, first section 328 of valve 304 passes fluid in a manner which extends actuator 48. Third section 322 retracts actuator 48 in the manner described above. Unlike second section 130 of valve 104, second section 330 of valve 304 does not prevent fluid flow to actuator 48. Instead, second section 330 restricts fluid flow. Accordingly, when controller 302 determines that actuator 48 has moved faster than actuator 50, and is positioned outside the tolerance of acceptable synchronization, controller 302 outputs a signal on left hand valve output 338 which causes valve 304 to move to the position shown in FIG. 5. Fluid flow continues to actuator 48, but is slowed by second section 330. Accordingly, movement of actuator 48 is slowed, rather than stopped. This results in a smoother synchronization of room 30 because each of the interruptions of valves 304, 306 simply slow the movement of the corresponding actuator 48, 50, without resulting in abrupt stopping and starting of the actuator. Valve 306 is substantially identical to valve 304, and includes a second section 350 which restricts fluid flow to actuator 50.

Figure 6:
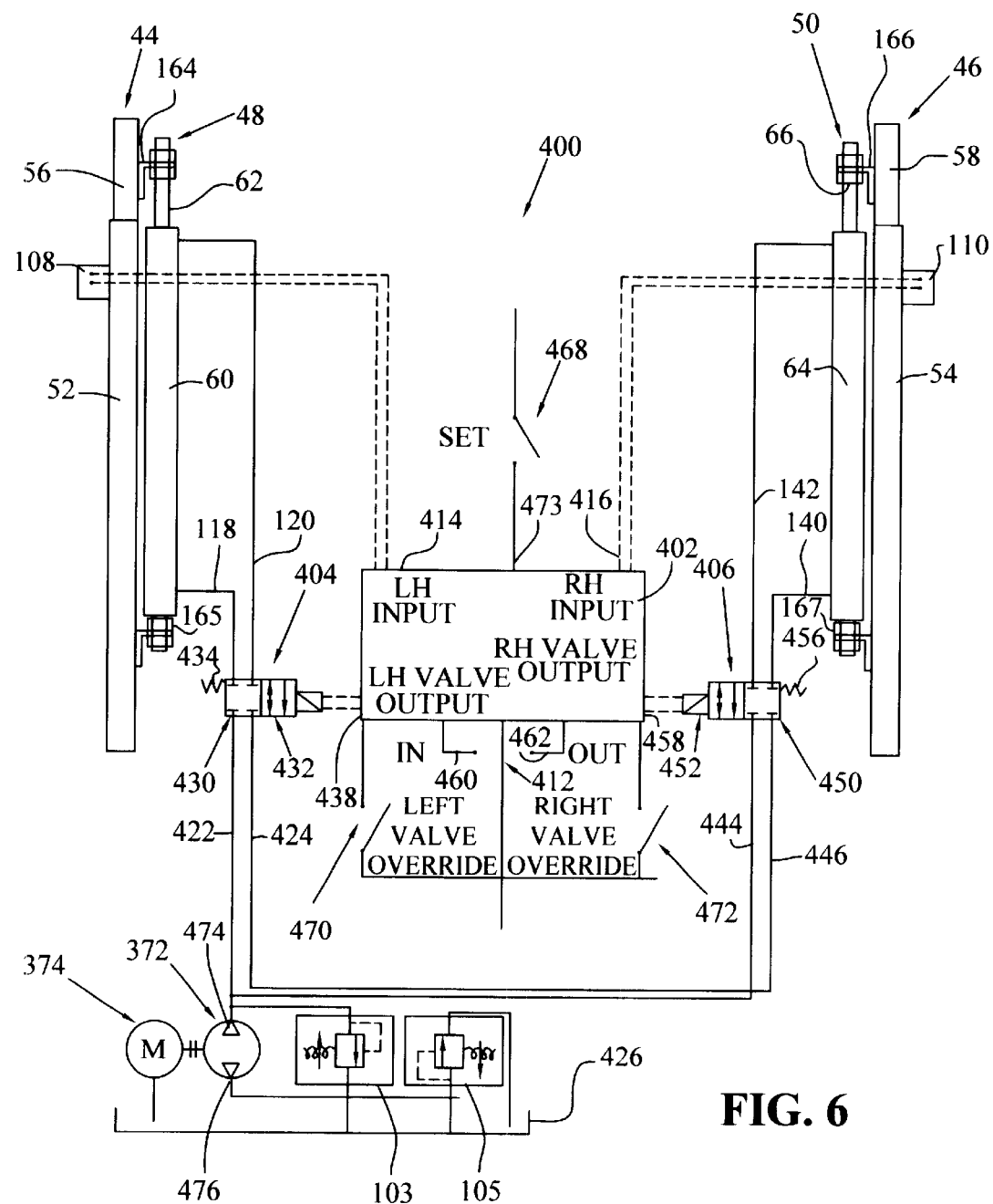
FIG. 6 is a schematic diagram of another embodiment of the synchronizer according to the present invention.

Referring now to FIG. 6, synchronizer 400 is shown. Synchronizer 400 is substantially similar to synchronizer 100. Accordingly, the reference designations of like components have been retained, but increased by 300. Unlike synchronizer 100, synchronizer 400 includes a bi-directional pump 372 which permits the use of two-position valves 404, 406. Specifically, valve 404 includes a first section 430 which is identical to second section 130 of valve 104 (FIG. 3), and a second section 432 which permits bi-directional fluid flow through two passages. When valve 404 is moved such that second section 432 registers with lines 118, 120 to actuator 48, controller 402 can cause motor 374 to spin pump 372 such that fluid flows from outlet 474. As fluid flows through line 422, second section 432, and line 118 into the rear chamber cylinder 60, piston 62 is extended. Conversely, controller 402 may cause motor 374 to spin pump 372 in an opposite direction such that fluid flows from outlet 476. This fluid flows to line 424, through second section 432 of valve 404, and through line 120 into the forward chamber of cylinder 60. As a result, piston 62 is retracted. Spring 434 biases valve 404 into the position shown in FIG. 6. As should be understood from the drawing, valve 406 is substantially identical to valve 404, and operates in the same manner as described above. Relief valve 105 is the same as relief valve 103, but connected to output 476 of pump 372.

Figure 7:
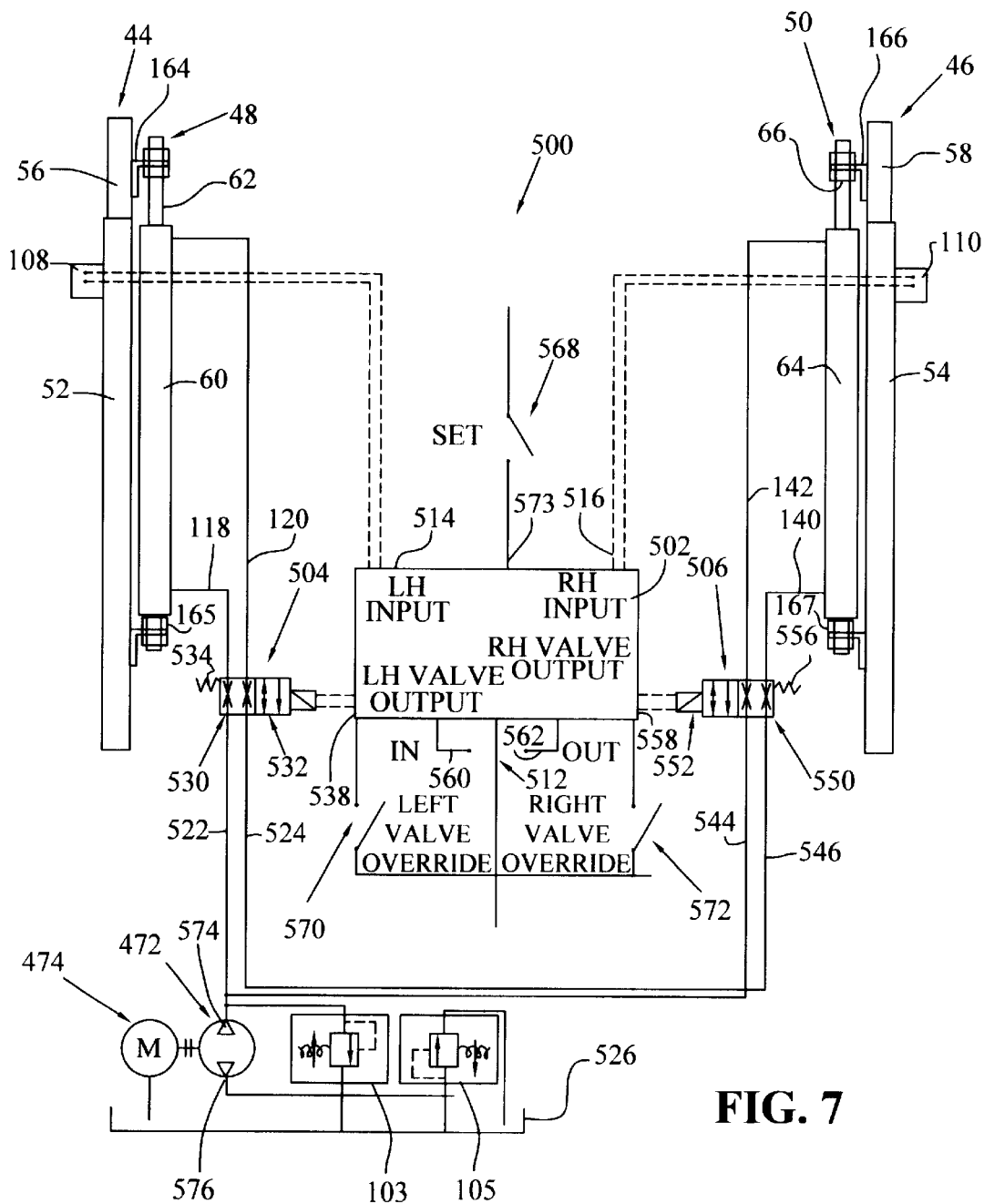
FIG. 7 is a schematic diagram of a variation of the synchronizer of FIG. 6.

FIG. 7 shows synchronizer 500 which is substantially identical to synchronizer 400, except that valves 504, 506 include restriction sections 530, 550, respectively, while valves 404, 406 include cut-off sections 430, 450, respectively. As a result, when controller 502 moves either one of valves 504, 506 into the position shown in FIG. 7, fluid flow to the corresponding actuator 48, 50 is restricted and slowed, not stopped, resulting in smoother operation as described above.

Referring now to FIGS. 8A–8G, a variety of sensor embodiments are shown. In each of the figures, a single extendable support 44 is shown with a single sensor 108A–108G corresponding to the support. Each of the sensors provides a status signal to a controller, for example, controller 502 of FIG. 7, to indicate the position or movement of inner support 56 relative to outer support 52. It should be understood that, for each embodiment described below, a similar sensor would be used in association with extendable support 46. Moreover, any of the sensors described below may be used with any of synchronizers 100, 300, 400, or 500.

Figure 8:
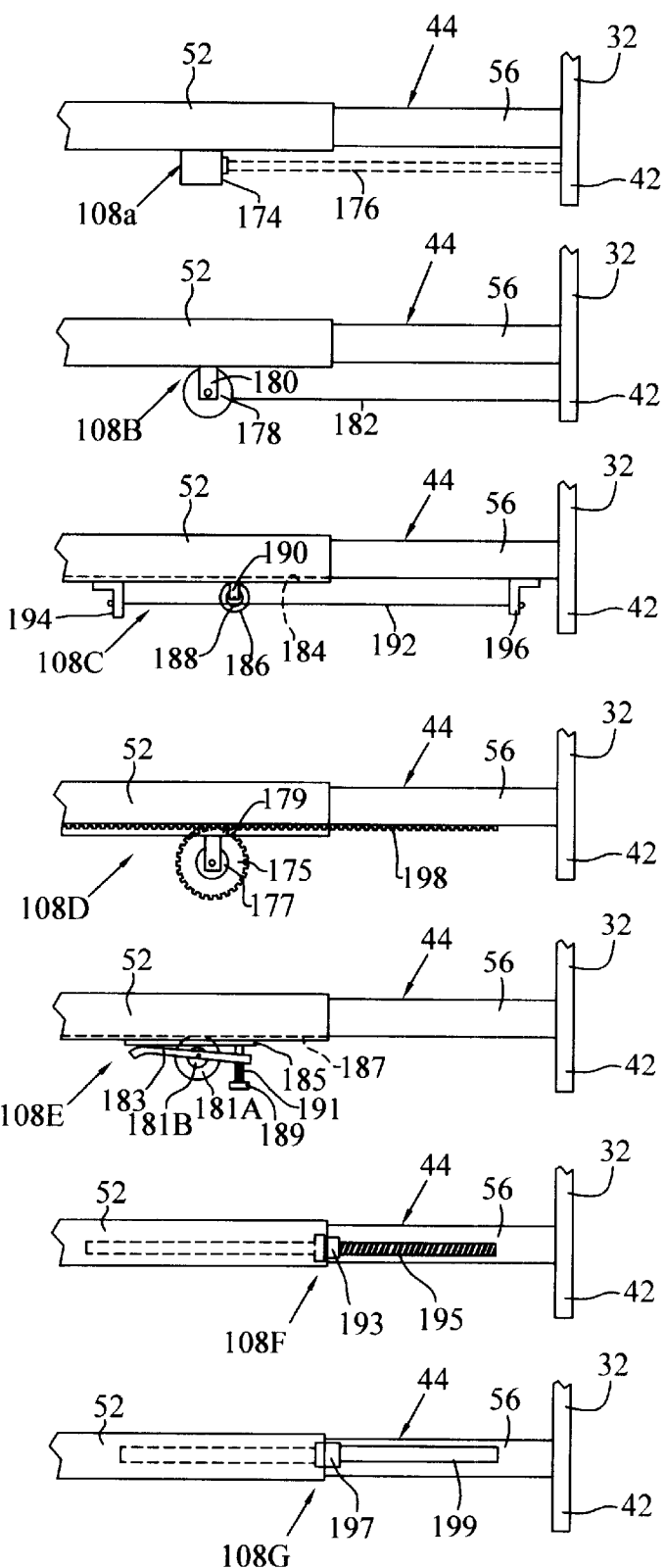
FIGS. 8A–8G are partially fragmented, side elevational views of various embodiments of sensors or encoders used to measure the position or movement of an extendable support.

Referring now to FIG. 8A, sensor 108A is an optical or sonic distance measuring device including an output 174 which emits a light signal or sound signal (indicated by numeral 176) that reflects off of a portion of back wall 32 of room 30, or other part of room structure. As shown, sensor 108A bounces the signal off of fascia 42 and measures the time required for the signal to travel from output 174, to fascia 42, and back to output 174 according to principles well known in the art. Sensor 108A also provides a status signal over wires (not shown) connected to left-hand input 514 of synchronizer 500. As will be further described below, each sensor 108A may be calibrated to a reference position during an initialization procedure. Once calibrated, controller 502 can interpret movement of inner support 56 relative to the reference position, thereby permitting calculation of an absolute position of back wall 32 of room 30. As also described below, once a reference position is established for sensor 108A and the sensor corresponding to support 46, a desired in-stop position and out-stop position for each expandable support 44, 46 may also be measured relative to the reference position. Once in-stop and out-stop positions are established according to the initialization procedures described below, controller 502 can automatically stop either expandable support 44, 46 at its desired in-stop or out-stop position.

FIG. 8B shows another sensor for monitoring and reporting movement of inner support 56 relative to outer support 52. Sensor 108B includes a body 178 mounted to outer support 52 by bracket 180. A cable 182 extends from body 178 and is connected to fascia 42. Cable 182 is wound about a spool (not shown) within body 178 and is spring loaded to retract within body 178. As inner support 56 is moved out of outer support 52, cable 182 is pulled from body 178, and an encoder or other such counting device produces a status signal corresponding to, for example, each standard unit of measurement of extension of cable 182 according to principles well known in the art. Retraction of cable 182 similarly indicates retraction of inner support 56.

FIG. 8C shows a sensor 108C. Outer support 52 includes a slot 184. A rotary encoder or potentiometer 186 or other such device with an attached spool or pulley 188 is mounted by bracket 190 adjacent a slot 184 formed in outer support 52. A cable 192 extends around pulley 188 between a first bracket 194 mounted to inner support 56 and a second bracket 196 mounted to inner support 56. As inner support 56 moves telescopically into and out of outer support 52, first bracket 194 moves within slot 184, and cable 192 moves about pulley 188, causing rotation of rotary encoder 186. Rotary encoder 186 thereby provides a status signal to controller 502 to indicate counts or uniform distances of movement of inner support 56 according to principles well known in the art.

FIG. 8D shows sensor 108D which includes a rack 198 mounted to inner support 56, and a pinion 175 for engaging rack 198. A rotary encoder or potentiometer 177 is mounted to pinion 175. Pinion 175 and rotary encoder 177 are mounted to outer support 52 with bracket 179. As inner support 56 moves into and out of outer support 52, rack 198 causes rotation of pinion 175 and rotary encoder 177. Rotary encoder 177 thereby provides a status signal corresponding to uniform distances of movement of inner support 56 according to principles well known in the art.

FIG. 8E shows a sensor 108E including a wheel 181A, a rotary encoder 181B, a support bracket 183, and a mounting bracket 185 which is mounted to outer support 52 such that wheel 181A extends through a groove 187 formed in outer support 52. Sensor 108E further includes a pin 189 that extends through support bracket 183 and is connected to mounting bracket 185. A spring 191 is positioned between the head of pin 189 and support bracket 183 to bias support bracket 183 upwardly as viewed in FIG. 8E. It should be understood that support bracket 183 is mounted for pivotal movement toward and away from outer support 52. Accordingly, as spring 191 biases support bracket 183 toward outer support 52, wheel 181A, which may be made of rubber or other non-slip material, is also biased into engagement with the bottom surface of inner support 56. Wheel 181A therefore rotates as inner support 56 moves into and out of outer support 52. This rotation causes rotation of rotary encoder 181B, which provides a status signal corresponding to uniform distances of movement of inner support 56 relative to outer support 52.

FIG. 8F shows a sensor 108F which includes an optical reader 193 such as a bar code reader mounted to the end of outer support 52, and a distance strip 195 attached to inner support 56 which includes a plurality of equally spaced, dark stripes. As inner support 56 is moved into and out of outer support 52, distance strip 195 passes by reader 193 which senses and counts the dark bars. Reader 193 provides a status signal to controller 502 each time a bar passes by reader 193. It should be understood that each bar corresponds to a uniform distance of movement of inner support 56. It should also be understood that, alternatively, a plurality of evenly spaced holes may be formed in inner support 56 or a strip mounted to inner support 56 such that optical reader 193 counts the passage of the holes. Similarly, raised surfaces such as pegs or peaks of a saw tooth configuration may be sensed using a magnetic reader 193.

FIG. 8G shows a sensor 108G which includes a resistance sensor 197 mounted to the end of outer support 52, and a resistive strip 199 mounted to inner support 56. According to principles well known in the art, resistance sensor 197 measures the resistance between a probe (not shown) in contact with resistive strip 199, and an end of resistive strip 199. Accordingly, as inner support 56 moves away from outer support 52, the total distance of resistive strip 199 between the two measurement points increases, thereby increasing the resistance. Conversely, as inner support 56 moves toward outer support 52, the total distance of resistive strip 199 between the two measurement points decreases, thereby decreasing the resistance measured by resistance sensor 197. Resistance sensor 197 also provides a status signal (typically an analog voltage) to controller 502 which interprets the status signal, according to a predetermined scheme, to indicate a particular position of back wall 32 of room 30.

It should be understood that the various sensors 108A–108E described above with reference to FIGS. 8A–8G are not intended to constitute an exhaustive list of the possible sensor configurations. To the contrary, any of a variety of other methods for determining the movement or position of back wall 32 of room 30 and providing a status signal indicating either the total distance of travel from a reference position, or the completion of incremental distances of travel toward or away from the reference position may be used.

Figure 9:
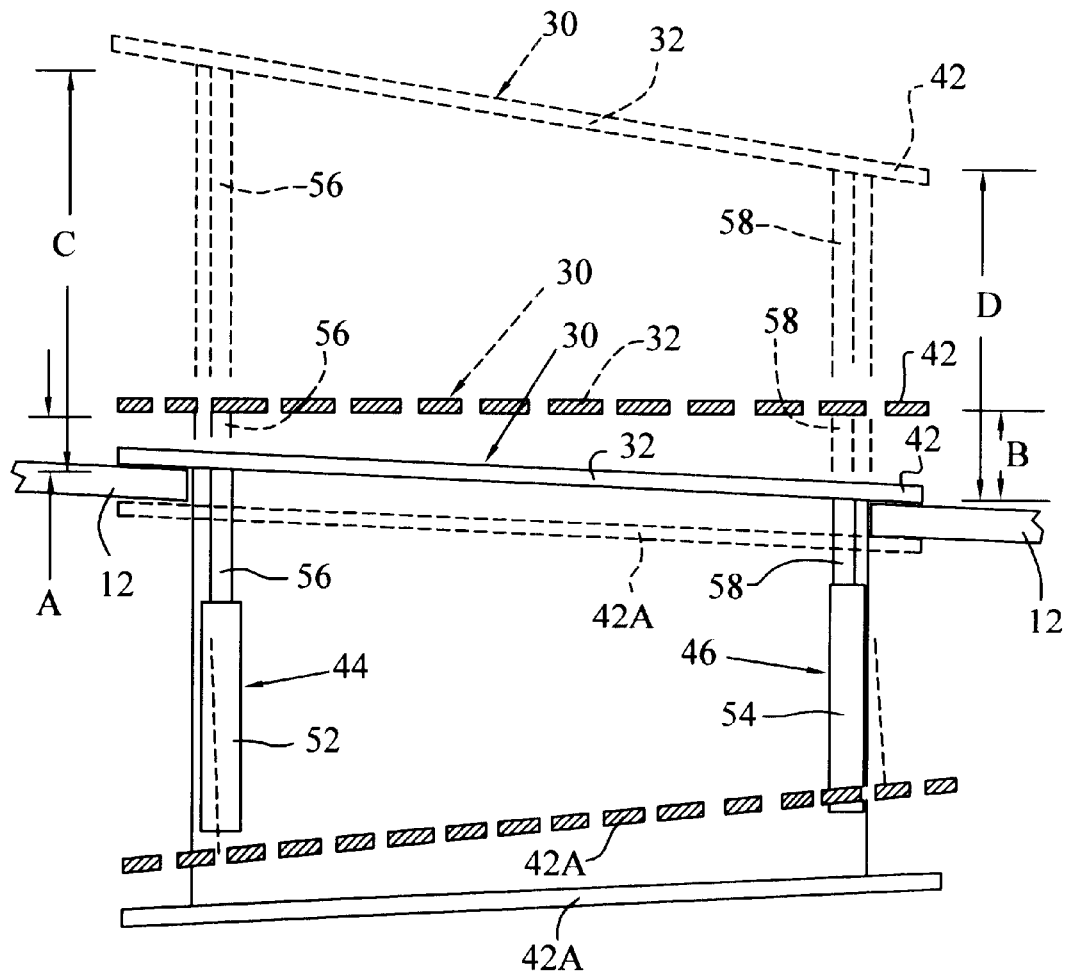
FIG. 9 is a top plan view depicting a slide-out room in a retracted, partially extended, and fully extended position.

FIG. 9 shows room 30 in a reference position (dashed lines), a retracted position (solid lines), and an extended position (dotted lines). To better illustrate the procedure for initializing a synchronizer according to the present invention, various misalignments between components of room 30 and vehicle side wall 12 have been greatly exaggerated in FIG. 9. Synchronizer 500 of FIG. 7 is referred to below in the description of the initialization procedure. Of course, any of the various synchronizer embodiments described above may be initialized using the same procedures.

Figure 10:
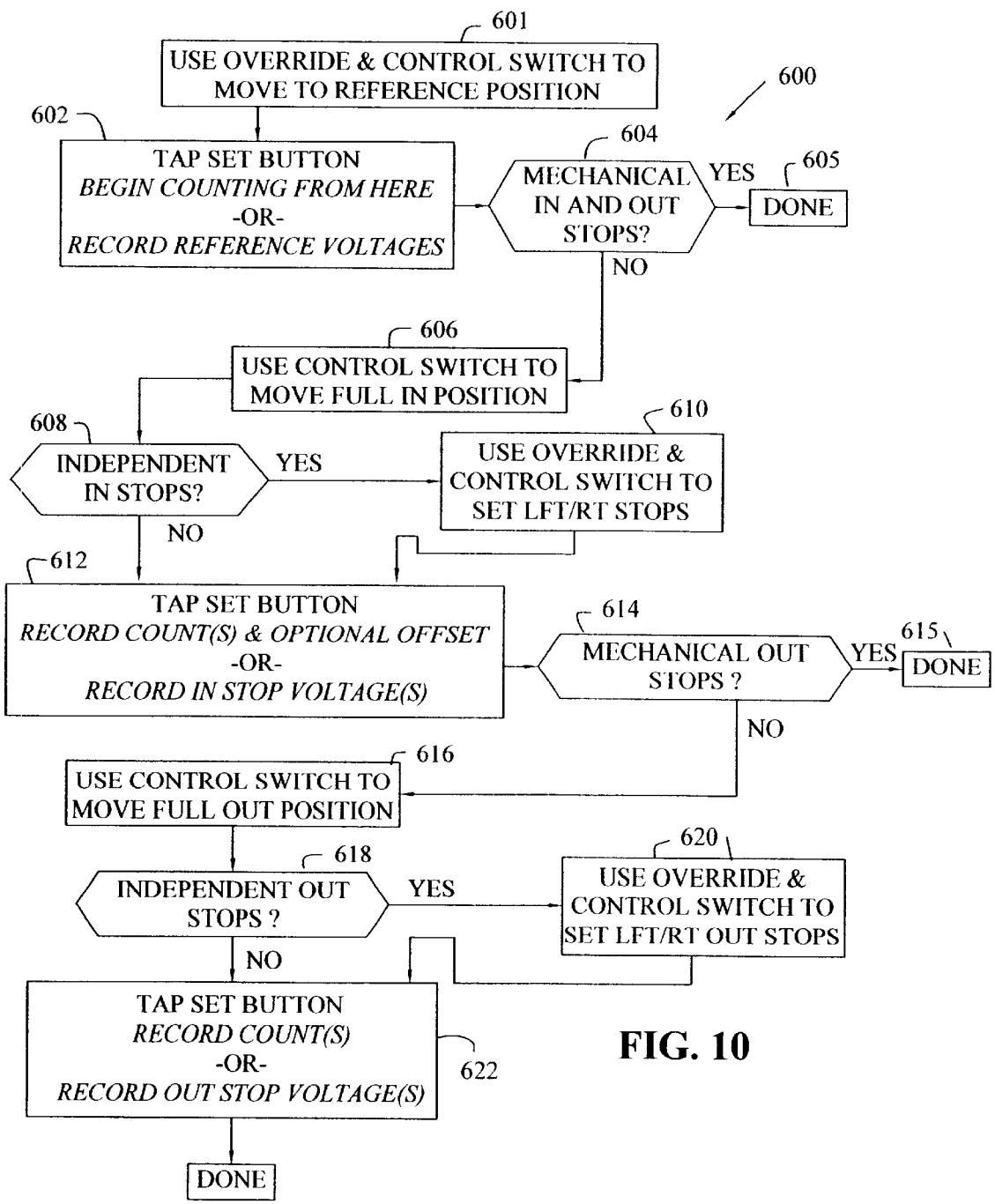
FIG. 10 is a block diagram depicting an initialization procedure for a synchronizer according to the present invention.

Referring now to FIGS. 7, 9 and 10, the initialization procedure begins by moving room 30 to a reference position. Room 30 may be moved by actuating control switch 512. Additionally, extendable support 44 may be moved independent of extendable support 46 by closing left valve override switch 570 and operating control switch 512 in the desired direction. Likewise, extendable support 46 may be operated independent of extendable support 44 by actuating right valve override switch 572 and using control switch 512 to control direction. The reference position is preferably a position, wherein back wall 32 of room 30 is substantially parallel to vehicle side wall 12. In fact, the reference position may be the same as a fully retracted position (shown in solid lines in FIG. 9), wherein fascia 42 of room 30 is drawn tight against vehicle side wall 12. The following discussion assumes a reference position which is different from the fully retracted position. The procedure for moving room 30 into the reference position is indicated by block 601 of FIG. 10.

When room 30 is in the reference position, sensors 108, 110 may provide a status signal indicating the position of extendable supports 44, 46, respectively. For example, if an optical sensor as shown in FIG. 8A is used, the status signals from the sensors will provide a distance measurement from the sensors to fascia 42 of room 30. Similarly, if a linear resistance sensor such as that shown in FIG. 8G is used, the status signal will consist of voltages or current corresponding to the resistance measured between the two probes of resistance sensors 197. On the other hand, if an encoder is used such as those shown in FIGS. 8B–8F, status signals or counts are output to controller 502 only after inner supports 56, 58 move a distance corresponding to a single count. While both inner supports 56, 58 likely moved a distance which generated a plurality of counts during the positioning step of block 601, such encoder systems generally would not provide status signals when room 30 is stationary in the reference position.

As indicated by block 602 of FIG. 10, set switch 568 is next actuated to establish the reference position of extendable supports 44, 46. More specifically, if encoder sensors are used, the actual counts stored by controller 502 are either stored as reference counts corresponding to each extendable support 44, 46, or the memory locations within controller 502 corresponding to the left and right reference count values are zeroed. If sensors such as the optical sensor of FIG. 8A or the resistive sensor of FIG. 8G are used, the output voltages provided by the sensors are stored by controller 502 as reference voltages corresponding to the positions of extendable supports 44, 46.

It should be understood that there are a variety of methods for establishing the in-stop positions and the out-stop positions of room 30. Additionally, the left out-stop position may be set independent of the right out-stop position. Likewise, the left in-stop position may be sent independent of the right in-stop position. Some of the various mechanisms for establishing the in and out-stop positions, and the difference between independent in-stops and independent out-stops will be described in greater detail below. The following discussion assumes that the in and out-stop positions correspond to data stored in controller 502 (i.e., programmed in and out-stops), that the right in-stop position is set independent of the left in-stop position, and that the right out-stop limit is set independent of the left out-stop limit (i.e., independent stops).

After the reference counts (or voltages) are stored in controller 502 at block 602 of FIG. 10, and assuming that mechanical in and out-stops are not used (block 604), control switch 512 is used to move room 30 to the retracted or full in position as indicted by block 606. Again, if the reference position corresponds to the retracted position, the step of block 606 is skipped. If the two positions are different as shown in FIG. 9, the movement between the reference position and the retracted position is synchronized according to the procedure illustrated in FIG. 4. Assuming independent in-stops (block 608), the operator next uses override switches 570, 572 and control switch 512 to independently operate left extendable support 44 and right extendable support 46 such that fascia 42 of room 30 is pulled tightly against vehicle side wall 12 as shown in solid lines in FIG. 9. This step of adjusting the retracted or full in position (and therefore the left and right in-stop positions) is indicated at block 610 of FIG. 10.

After it is visually determined that room 30 is in a satisfactory retracted position such that the perimeter seal (not shown) sandwiched between fascia 42 and vehicle side wall 12 is properly compressed, the operator actuates set button 568 to establish the in-stop positions as indicated by block 612. If an encoder system is used, the number of counts generated by movement of inner support 56 from its reference position is stored, and the number of counts inner support 58 was moved from its reference position is stored. The total number of counts generated by movement of inner support 56 corresponds to distance A of FIG. 9. The total number of counts generated by movement of inner support 58 corresponds to distance B. As can be seen in the figure, distance A is less than distance B in this example. Accordingly, inner support 58 is offset inwardly relative to inner support 56 when room 30 is in the retracted position. This offset corresponding to the difference between distance B and distance A may be stored in controller 502 as the difference between the two counts generated by sensors 110, 108, respectively. Alternatively, if continuous voltage generating sensors are used such as the optical sensor of FIG. 8A or the resistive sensor of FIG. 8G, actuation of set button 568 (at block 612) causes controller 502 to store the voltage value of each of sensors 108, 110 in a memory location corresponding to the left and right in-stop positions, respectively. The offsetting counts between extendable member 44 and extendable member 46 established in block 612 may be maintained by the synchronization procedure of FIG. 4 as room 30 is moved away from the retracted position. As described above, a tolerance may also be provided to reduce the number of valve interruptions during synchronization. Similarly, if distance sensors such as those described in FIGS. 8A and 8G are used, the offset in voltage between the two sensors 108, 110, plus a tolerance value will be maintained during synchronization as room 30 is moved away from the retracted position.

It should be understood, however, that the count/voltage offsets described above need not be maintained during synchronization. For example, if the left and right reference counts were zeroed in block 602, and distances A and B correspond to minus 7 and minus 10 counts, respectively, then the count offset between extendable support 44 and extendable support 46 when in the retracted position is three counts. When an operator uses control switch 512 to move room 30 from the retracted position, controller 502 may first actuate valve 506 to extend inner support 58 three counts. Movement of inner support 56 and inner support 58 may then be synchronized by interrupting the appropriate valves when the difference between the inner supports exceeds the predetermined tolerance (for example, two counts).

Similarly, if the status signal from sensor 108 at the reference position is two volts, and the status signal from sensor 110 at the reference position is 1.8 volts (the difference being attributable to, perhaps, different mounting locations of extendable supports 44, 46 or different mounting locations of sensors 108, 110), these voltages will be treated as the reference voltages. Assuming that sensor 108 outputs 1.5 volts at the in-stop position, and sensor 110 outputs 1.0 volt at the in-stop position, the actual offset between left extendable support 44 and right extendable support 46 relative to the offset present at the reference position is 0.3 volts. At the reference position, the status signal from sensor 110 was 0.2 volts less than the status signal from sensor 108. At the full in position, the status signal from sensor 110 is 0.5 volts less than the status signal from sensor 108, representing an offset of 0.3 volts. When an operator uses control switch 512 to move room 30 out of the retracted position, controller 502 may either maintain this offset during synchronization or first operate valve 506 to extend inner support 58 a distance corresponding to 0.3 volts from sensor 110, thereafter maintaining synchronization between inner support 56 and inner support 58 to within a predetermined tolerance.

Again assuming mechanical stops are not used (block 614), the next step in the initialization procedure is to actuate control switch 512 to move room 30 to the extended or full out position as indicated by block 616. Assuming independent stops (block 618), the operator next uses override switches 570, 572 and control switch 512 to independently extend inner support 56 and inner support 58 such that the inner fascia 42A of room 30 is drawn tight against the inner surface of vehicle side wall 12. This adjustment of the left and right out-stop positions is indicated by block 620. As shown in FIG. 9, left inner support 56 travels through distance C to its out-stop position, and right inner support 58 travels through distance D. The total counts corresponding to these distances (relative to the reference position) are stored by controller 502 as the left and right-out stop positions when the operator taps set switch 568 as indicated by block 622. If continuous output voltage sensors are used, the voltages from sensors 108, 110 are stored as out-stop voltages when room 30 reaches the extended position and set switch 568 is actuated.

It should be understood that, given data representing left and right reference positions, left and right in-stop positions, and left and right out-stop positions, synchronizer 500 can automatically move extendable supports 44, 46 between their respective in-stop and out-stop positions, synchronizing movement therebetween, upon actuation of control switch 512 as further described below.

Figure 11:
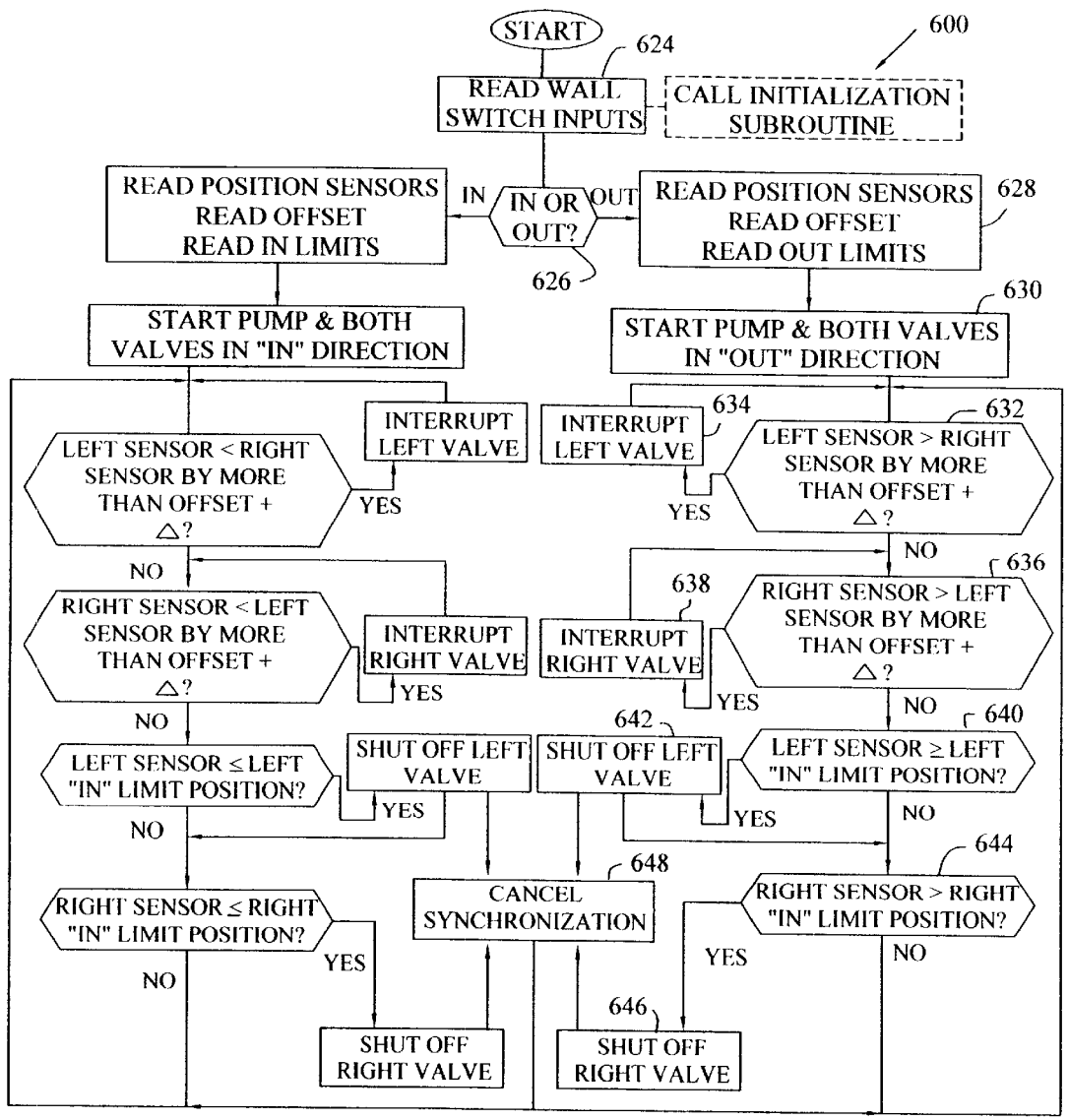
FIG. 11 is a block diagram depicting another mode of operation of a synchronizer according to the present invention.

FIG. 11 depicts the operation of a synchronizer according to the present invention having programmable stops as described above. At block 624, controller 502 reads the status of switches 512, 570, 572 and 573. Controller 502 may be programmed to recognize any of a variety of combinations of these switches at power-up to correspond to a request to execute the initialization subroutine 600 outlined in FIG. 10. For example, controller 502 may be programmed to recognize an input from set switch 568 on input 573 at power-up as a request for execution of initialization subroutine 600. Assuming initialization is not requested, controller 502 determines the position of control switch 512 at block 626 and follows the logic in one of the two branches shown in FIG. 11, depending upon the direction of room movement desired. Both branches shown in FIG. 11 are identical. Therefore, only one will be described in detail below.

Assuming the operator desires to move room 30 from its retracted position to its extended position, controller 502 will read the present status signals from sensors 108, 110, and read the offset amount and left and right out-stop positions ("out limits") established during initialization and stored in the memory of controller 502. After reading these values at block 628, controller 502 starts pump 472 in a direction causing hydraulic fluid output from outlet 574, and moves valves 504, 506 such that sections 532, 552, respectively, permit the flow of hydraulic fluid. As should be apparent from FIG. 7, this permits pump 472 to pump fluid into the rear chambers of cylinders 60, 64, which in turn extends pistons 62, 66 and inner supports 56, 58, respectively. As soon as outward motion of room 30 is initiated at block 630, synchronizer 500 begins comparing the position of left inner support 56 to that of right inner support 58 by monitoring status signals from sensors 108, 110. At decision block 632, controller 502 determines whether the number of counts received from left sensor 108 is greater than the number of counts received from right sensor 110 by more than the offset amount as discussed with reference to FIG. 9, plus a tolerance value. It should be understood that voltages from sensors 108, 110 may also be compared, as well as other relatively continuous, position-indicating signals from sensors 108, 110, depending upon the type of sensor used. For convenience, encoders will be assumed which provide a count for each standard unit of measurement traveled by the respective inner support 56, 58.

It should also be understood that the operation depicted by the flow diagram in FIG. 11 assumes that the initial offset between left and right inner supports 56, 58 when in the retracted position (if any) will be maintained throughout travel to the extended position. As discussed above, an alternative sequence of operation would include a first step of independently extending, for example, right inner support 58 by an amount corresponding to the offset count stored upon initialization. Thereafter, extendable members 44, 46 would be actuated simultaneously, and synchronization would be maintained to within the predetermined tolerance.

If, at decision block 632, controller 502 determines that the status signal from left sensor 108 is greater than the status signal from right sensor 110 by more than the offset amount plus a predetermined tolerance, left valve 504 is interrupted (i.e., shifted by controller 502 such that first section 530 restricts flow of hydraulic fluid) as indicated at block 634. If controller 502 determines at block 632 that the status signal from sensor 108 is not greater than the status signal from sensor 110 by an amount resulting in interruption of valve 504, controller 502 compares the status signal from right sensor 110 to the status signal of left sensor 108 at block 636 to determine whether valve 506 should be interrupted to slow the extension of inner support 58 as indicated by block 638. If sensors 108, 110 indicate that extendable members 44, 46 are moving substantially in unison, then controller 502 checks whether the status signal from left sensor 108 indicates that inner support 56 has reached the out-stop position. If inner support 56 has reached the out-stop position, valve 504 is shut off (or restricted as is the case for synchronizer 500) at block 642. As should be apparent regarding the example of FIG. 9, right inner support 58 will reach its out-stop position before left inner support 56 reaches its out-stop position. Accordingly, controller 502 would initially determine at block 640 that left inner support 56 has not yet reached its out-stop position. Controller 502 then checks whether right inner support 58 has reached its out-stop position according to the status signal from sensor 110 at block 644. If sensor 110 indicates that right inner support 58 has reached the out-stop position, controller 502 shuts off (or restricts in the case of synchronizer 500) right valve 506 as indicated at block 646.

Assuming right inner support 58 has reached its out stop position (as shown in dotted lines in FIG. 9) when controller 502 performs the comparison indicated at block 644, right valve 506 is shut off at block 646 and synchronization is cancelled at block 648. More specifically, decision blocks 632 and 636 will be skipped and controller 502 will continuously actuate left inner support 56 until left sensor 108 indicates that left inner support 56 has reached its out-stop position. When this occurs, decision block 640 causes controller 502 to shut off left valve 504 at block 642, and also shut off the pump. When programmable stops are used as described above, the operation of synchronizer 500 automatically stops when both inner supports 56, 58 reach their out-stop positions. As should be apparent from the foregoing, if controller 502 determines at decision block 626 that control switch 512 is in the "IN" position, controller 502 follows the steps on the left hand side of FIG. 11 which are identical to those described above, except that the direction of movement of extendable members 44, 46 is reversed.

Figure 12A:
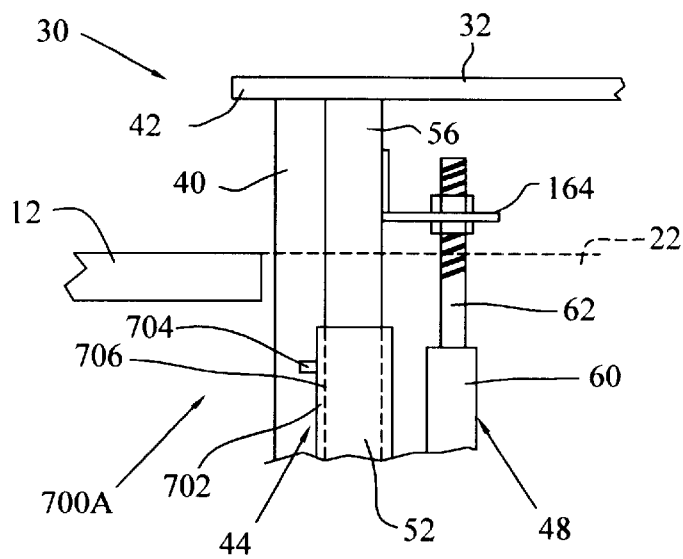
FIGS. 12A–12E are partially fragmented, top plan views of various mechanisms for establishing the fully extended and fully retracted positions of the slide-out room.

As indicated above, a variety of other methods for establishing in and out-stop positions may be used. FIGS. 12A–12E illustrate a few of these alternative methods. Referring now to FIG. 12A, a stop mechanism 700A is shown mounted to extendable support 44. Stop mechanism 700A is positioned to establish an out-stop limit for extendable support 44. It should be understood that a similar stop mechanism may be used on extendable support 44 to establish an in-stop position, and other similar stop mechanisms may be used with extendable member 46 to establish the right out and in-stop positions. Stop mechanism 700A is mounted within a slot 702 formed within outer support 52, and includes an L-shaped bracket 704 which is secured to inner support 56 by a fastener 706. As shown, when bracket 704 abuts the end of slot 702, inner support 56 cannot be further extended from outer support 52, thereby establishing the out-stop position. Fastener 706 is threaded into an opening (not shown) formed on inner support 56. It should be understood that a plurality of such openings may be formed in alignment with slot 702 along inner support 56 such that bracket 704 may be positioned at various locations along the length of inner support 56 to establish different out-stop positions.

Figure 12B:
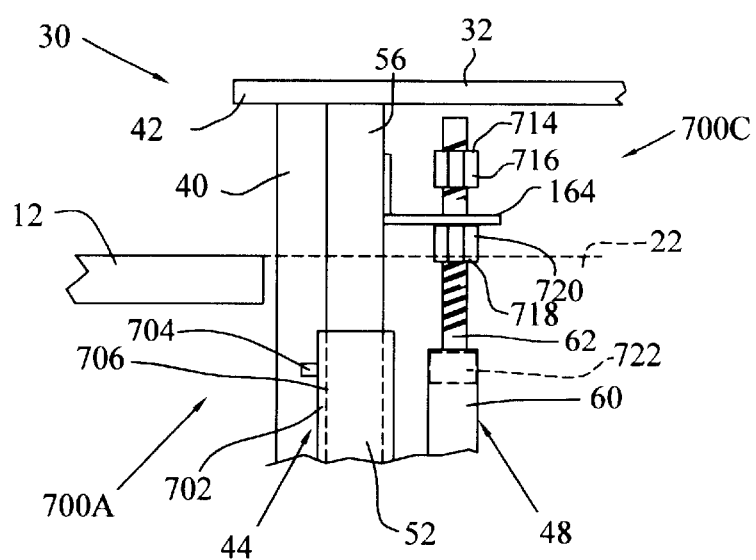

Referring now to FIG. 12B, stop 700C generally includes four nuts 714, 716, 718, 720 which are threaded onto the threaded portion of piston 62 of actuator 48. Specifically, actuator 48 is fully extended such that head 722 of piston 62 engages the front wall of cylinder 60. Nut 720 may then be turned on the threaded portion of piston 62 such that nut 720 moves toward the free end of piston 62, urging bracket 164 outwardly to further extend inner support 56 to the desired out-stop position. After the desired out-stop position is reached, lock nut 718 is tightened against nut 720 to secure nut 720 in the desired location. Nuts 714, 716 are similarly used to establish the in-stop position of extendable support 44.

Figure 12C:
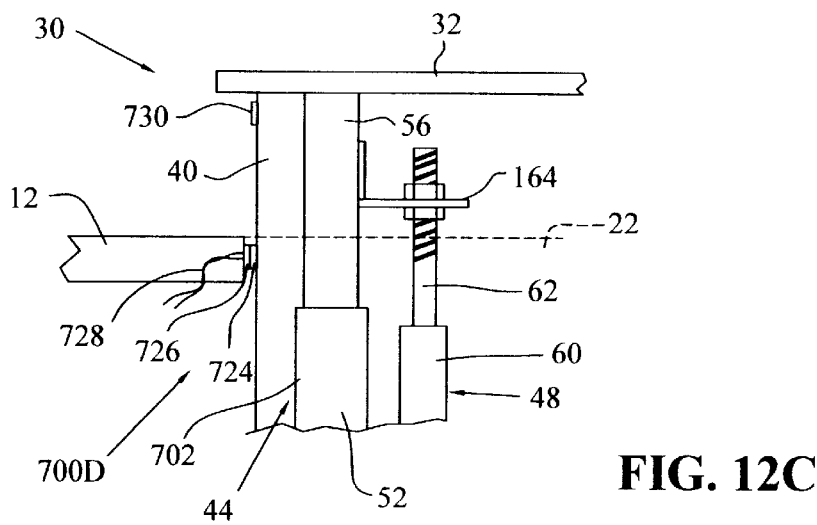

FIG. 12C shows stop 700D which includes a first ferrous element 724, a magnetic sensor 726 which is connected to controller 502 through wires 728, and a second ferrous element 730. First ferrous element 724 is mounted on side wall 36 or floor 40 of room 30 such that first ferrous element 724 comes into proximity with magnetic sensor 726 when room 30 is in a desired, out-stop position. Magnet sensor 726 detects the presence of first ferrous element 724 and provides a stop signal over wires 728 to controller 502. The mounting position of second ferrous element 730 similarly establishes an in-stop position. It should be understood that the magnetic sensing described with reference to stop 700D may readily be replaced with various other sensors including those using changes in capacitance, resistance, current, or voltage.

Figure 12D:
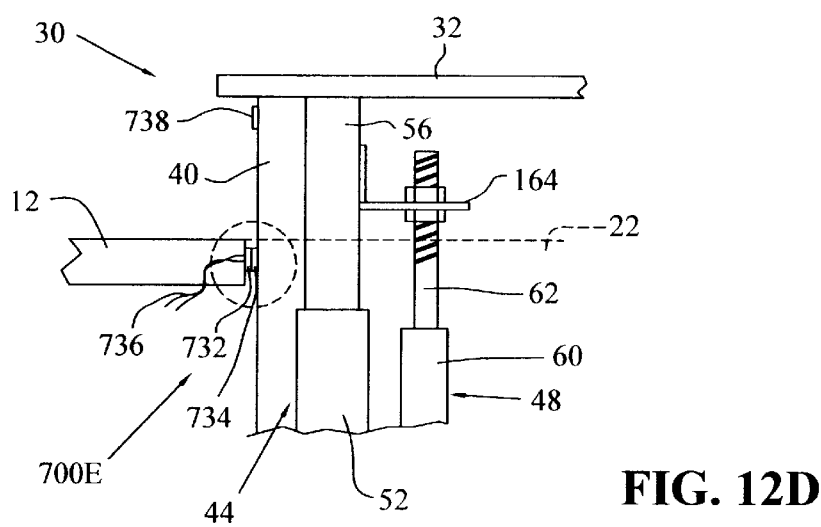
Figure 12E:
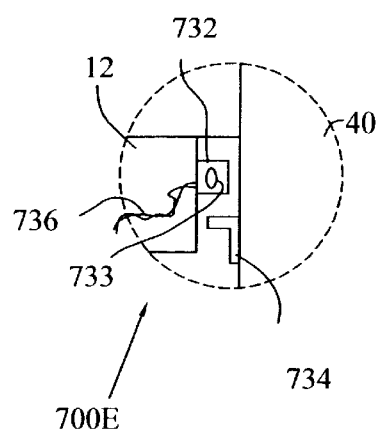

FIGS. 12D and 12E shows stop 700E which is a limit switch assembly including a limit switch 732 having an arm 733, and an actuation finger 734 mounted to side wall 36 of room 30, wires 736 connecting switch 732 to controller 502, and a second finger 738 mounted to room side wall 36. As shown, first finger 734 is mounted to side wall 36 such that when room 30 reaches a desired out-stop position, finger 734 engages arm 733, causing it to move into a switched position. Switch 732 provides a signal to controller 502 causing controller 502 to stop actuation of actuator 48. Similarly, second finger 738 is mounted to room 30 such that when room 30 is moved to the retracted position, finger 738 engages arm 733 and switches limit switch 732 into a second switched position. Limit switch 732 provides a signal to controller 502, again causing controller 502 to stop actuation of actuator 48. It should be understood that a variety of different actual switches may be mounted in a variety of different locations such that movement of room 30 relative to vehicle 10 trips the contact switch and provides a signal to controller 502.

Other types of stops may also be employed which essentially respond to engagement between inner fascia 42A and the inner surface of vehicle side wall 12 (FIG. 9), or the engagement between outer fascia 42 and the outer surface of side wall 12 (FIG. 9). For example, when actuators 48, 50 have been extended such that inner fascia 42A is fully engaged with the inner surface of vehicle side wall 12 (providing a tight inner seal), further extension of inner supports 56, 58 is not possible. Accordingly, as motor 374 and pump 472 continue to further drive actuators 48, 50, the pressure in actuators 48, 50 increases, causing motor 374 to draw increased current to maintain the operation of pump 472. An in-line current switch may be provided which senses increased current draw and provides a stop signal to controller 502 which causes controller 502 to move valves 504, 506 into the restricted positions, and stop motor 374 and pump 472. A circuit breaker may readily be substituted for an overcurrent switch to provide the same function. Alternatively, the increased hydraulic pressure may be sensed by a pressure switch which similarly provides a stop signal to controller 502.

A simple, straightforward method of stopping actuation of extendable members 44, 46 requires the cooperation of the operator. When room 30 is moved to either one of the extended or retracted positions, and motor 374 and pump 472 continue operating, the operator can visually determine whether room 30 is sufficiently extended or retracted, or can listen for a difference in the sound of operation of motor 374 and pump 472, indicating that further extension or retraction of extendable supports 44, 46 is not possible. When the operator determines that room 30 has reached an in or out-stop position, the operator may simply release control switch 512 (if control switch 512 is a momentary contact switch) or switch control switch 512 to an off-position (if control switch 512 is a sustained contact switch).

Figure 13:
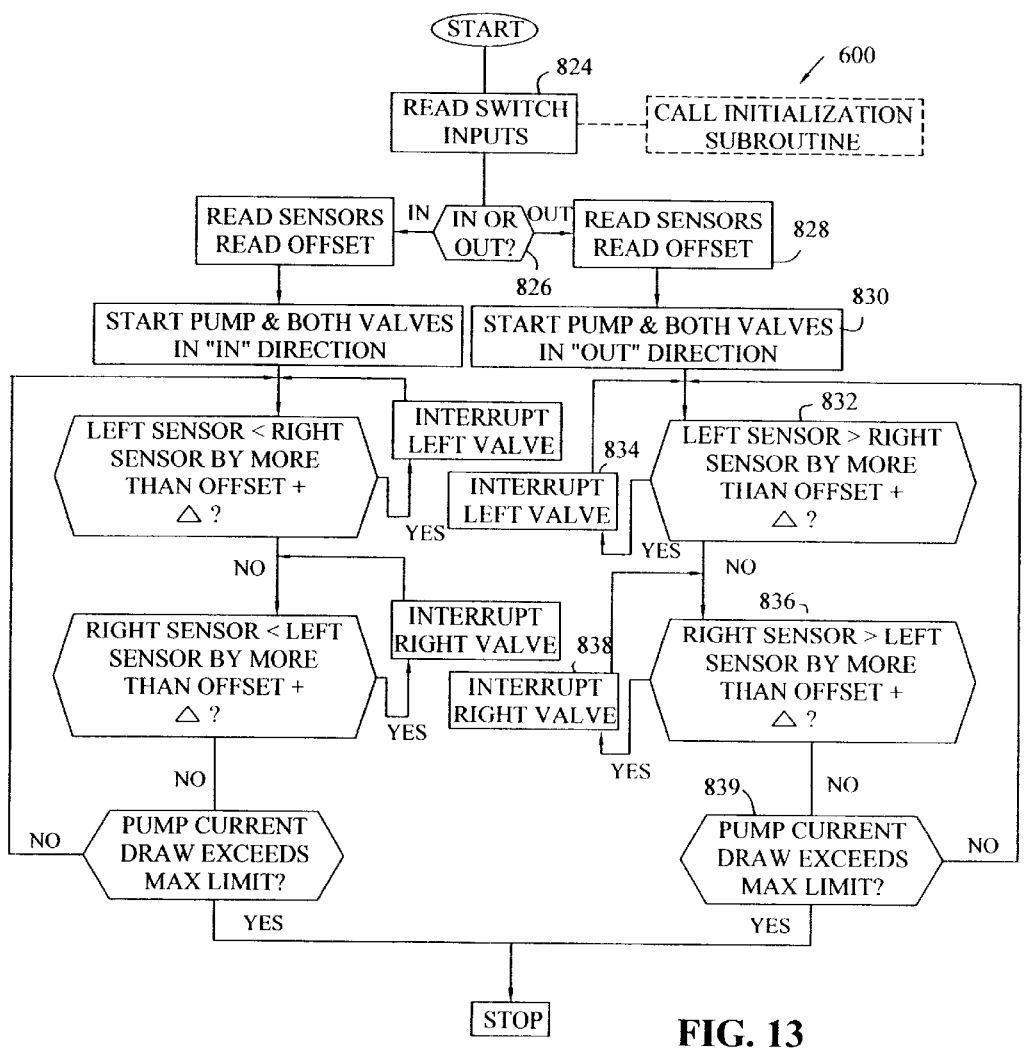
FIG. 13 is a block diagram depicting another mode of operation of a synchronizer according to the present invention.

FIG. 13 is a flow diagram similar to FIG. 11, showing the procedure for synchronizing movement of extendable members 44, 46, and terminating their movement when room 30 reaches the extended or retracted position. Unlike FIG. 11, which shows the procedure for terminating operation of synchronizer 500 using programmable stops, FIG. 13 illustrates the procedure for terminating operation of synchronizer 500 in response to an overcurrent condition of pump 472 as described above. Blocks in FIG. 13 which are functionally identical to blocks in FIG. 11 have retained their previous reference designation, increased by 200. At block 824, controller 502 determines whether the configuration of switches 512, 568, 570, 572 represent a request for initialization. If so, controller 502 operates according to initialization subroutine 600 illustrated in FIG. 10.

Referring briefly to FIG. 10, initialization of synchronizer 500 using overcurrent switches is essentially the same as the initialization of any synchronizer using electrical, mechanical, or any of the other stop mechanisms described above. Specifically, as indicated by decision block 604, an operator may adjust the physical location of any of the stop mechanisms described in FIGS. 12A–12E as appropriate to set the in-stop positions of room 30. If such physical stops are used for both in and out-stops, once these adjustments are made, the initialization procedure is complete at block 605. If the in-stop positions are programmable, then they are set as described above. At block 614, the physical out-stops are adjusted, and the initialization procedure is complete at block 615.

Referring again to FIG. 13, if, at block 824, initialization is not requested, then controller 502 determines at block 826 the position of control switch 512. Assuming that control switch 512 is in the "OUT" position, controller 502 (at block 828) reads sensors 108, 110 and the stored offset, and enables pump 472 and valves 504, 506 at block 830. Actuators 48, 50 begin extending extendable supports 44, 46, respectively. At decision block 832, controller 502 determines whether the status signal from sensor 108 is greater than the status signal from sensor 110 by more than the offset plus a tolerance. If extendable member 44 leads extendable member 46 (as indicated by sensors 108, 110), left valve 504 is interrupted at block 834. Similarly, if sensors 108, 110 indicate that extendable member 46 leads extendable member 44 by an amount greater than the offset plus a tolerance, right valve 506 is interrupted as indicated by blocks 836, 838. At block 839, controller 502 determines whether the current draw of motor 374 and pump 472 exceeds a predefined maximum limit. This predefined maximum limit corresponds to the threshold current of, for example, an overcurrent switch or a circuit breaker. The determination of whether this maximum limit is exceeded may be made by reading a signal provided by an overcurrent switch or Circuit breaker to controller 502 which corresponds to the increased load on motor 374 and pump 472 when room 30 is fully extended.

It should be understood that any of a variety of other types of switches (many of which are described above) including contact switches, proximity switches, magnetic switches, and capacitance switches, may be used in a similar fashion. If controller 502 determines at block 839 that the maximum limit is not exceeded, extendable supports 44, 46 continue to extend toward the extended position according to the synchronization procedure described above. If controller 502 determines at block 839 that the current draw from motor 374 and pump 472 exceeds the predetermined maximum limit, then controller 502 disables motor 374 and pump 472, and moves valves 504, 506 to their restricted positions.

Figure 14:
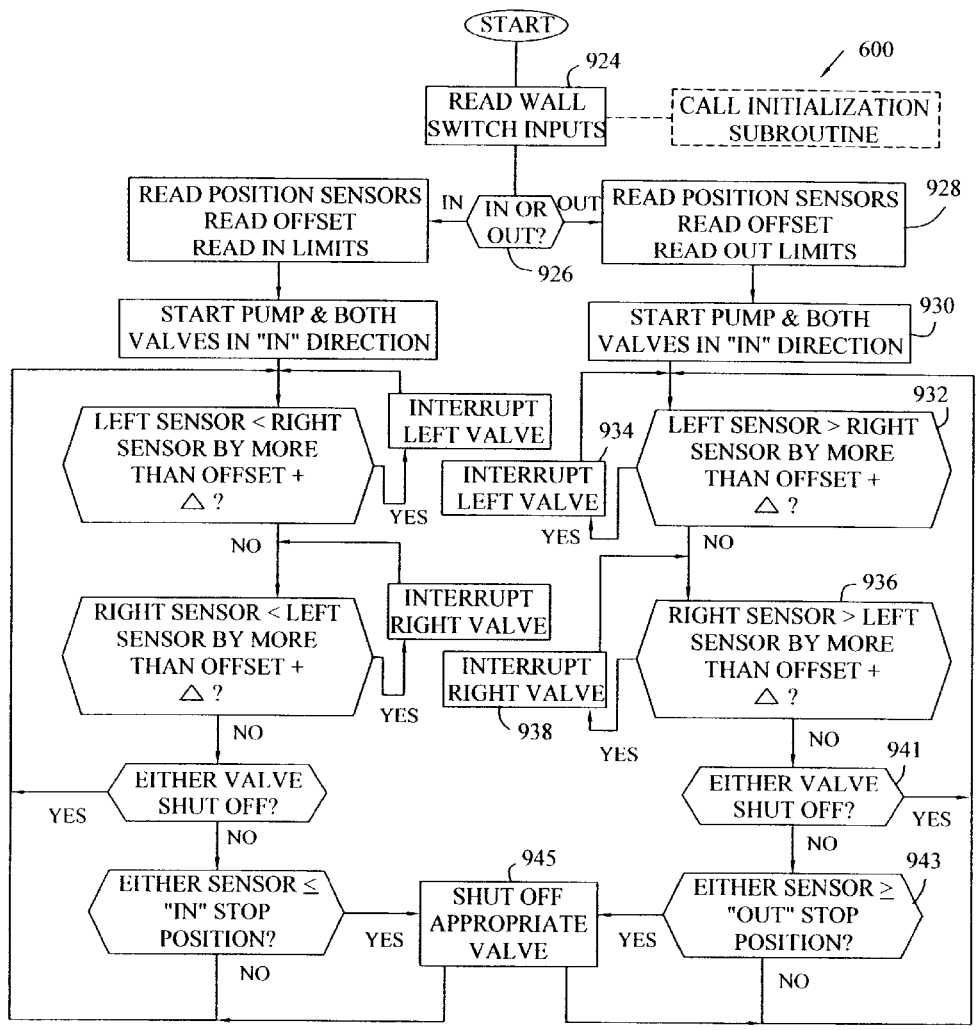
FIG. 14 is a block diagram of another mode of operation of a synchronizer according to the present invention.

FIG. 14 shows yet another synchronization and termination procedure for synchronizer 500 which is similar to that shown in FIG. 11. Accordingly, similar steps have retained their original reference designation, increased by 300. The procedure of FIG. 14 differs from that of FIG. 11 in that the FIG. 14 procedure disables only the first actuator 48, 50 that reaches an in or out-stop position, and allows the synchronization routine to terminate the other actuator 48, 50. Like the procedure of FIG. 11, the in and out stops set for the procedure in FIG. 14 are programmable stops set according to the initialization routine 600 of FIG. 10. The steps indicated by blocks 924, 926, 928, 930, 932, 934, 936, and 938 are identical to the corresponding blocks in FIG. 11. At block 941, controller 502 determines whether either valve 504 or valve 506 has been disabled (or moved to its restricted position). If neither valve 504, 506 has been disabled, then neither actuator 48 nor actuator 50 has yet reached its out-stop position as indicated by status signals from sensors 108, 110, respectively.

At block 943, controller 502 uses the data received from sensors 108, 110 to determine whether either extendable member 44, 46 has reached its predetermined out-stop position. If neither extendable member 44 nor extendable member 46 has reached its out-stop position, actuators 48, 50 continue to extend under the synchronization steps indicated by blocks 932, 934, 936, and 938. This cycle repeats until one of the extendable members 44, 46 reaches its out-stop position.

When this occurs, controller 502 determines at block 943 that one of extendable members 44, 46 has reached its out-stop position and shuts off the valve 504, 506 feeding the actuator 48, 50 corresponding to that extendable member 44, 46 (block 945). Controller 502 continues to extend the other actuator, thereby increasing the difference in relative position of actuators 48, 50. So long as that difference remains within the offset plus a tolerance, controller 502 follows the procedure indicated by blocks 932, 936, and 941. When the actuator 48, 50 passes the actuator 48, 50 that was previously stopped by an amount greater than the offset plus a tolerance, the corresponding valve 504, 506 is interrupted and stopped at either block 934 or block 938. It should be understood that the maximum distance of travel beyond a stopped extendable member 44, 46 controlled by the procedure described above may be set by varying the tolerance used at decision blocks 932, 936. If the tolerance is fairly loose, then both extendable members 44, 46 may reach their stop positions following the procedure outlined in FIG. 11. Alternatively, a loose tolerance may be used to permit one extendable member 44, 46 to reach a stop position, and then essentially establish the out-stop position of the other extendable member 44, 46 according to the procedure outlined in FIG. 14. It is certainly within the ability of one skilled in the art to program controller 502 to increase the tolerance after either extendable member 44, 46 reaches a stop position. This increased tolerance thus permits the other extendable member 44, 46 to travel farther relative to the stopped extendable member 44, 46 to ensure that fascia 42 (or fascia 42A) of the side of the room 30 corresponding to the moving extendable member firmly engages vehicle side wall 12 to provide a good seal.

It should be appreciated that many variations of the invention could be conceived by those skilled in the art, utilizing the concepts shown and described herein. One such variation is the use of the synchronizer in vertically movable systems, such as pop-up campers and the like, where the extendable members move vertically rather than horizontally. In such a system, as in horizontal systems, more than two actuators may be used.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A synchronizer for controlling the movement of a slide-out room mounted to a vehicle, the synchronizer including:
    first and second actuators to move the room between a retracted and an extended position relative to the vehicle;
    first and second sensors outputting first and second signals representing positions of the first and second actuators, respectively;
    first and second valves connected to the first and second actuators, respectively, each of the valves being adjustable between a first position enabling the corresponding actuator to move in a first direction and a second position inhibiting movement of the corresponding actuator; and
    a controller for moving the valves into and out of the first and second positions in response to the first and second signals to ensure that the actuators move the room at substantially the same rate;
    wherein the first and second valves are adjustable into a third position enabling the first and second actuators, respectively, to move in a second direction.

2. The synchronizer of claim 1 further including first and second movable supports mounted to the vehicle and connected to the room for supporting the room during movement between the extended and retracted positions, the first and second movable supports being driven by the first and second actuators, respectively.

3. The synchronizer of claim 1, wherein the second position of the first valve prevents movement of the first actuator, and the second position of the second valve prevents movement of the second actuator.

4. The synchronizer of claim 1 further comprising a bi-directional pump connected to the valves for driving the actuators.

5. The synchronizer of claim 4 further comprising a unidirectional pump connected to the valves for driving the actuators.

6. The synchronizer of claim 2, wherein the first movable support includes a first outer support connected to the vehicle and a first inner support connected to the room, and the second extendable support includes a first outer support connected to the vehicle and a first inner support connected to the room.

7. The synchronizer of claim 1, wherein a relative position of the actuators is initialized by moving the room into a reference position, and reading the first and second signals.

8. The synchronizer of claim 7, wherein the controller stores an offset corresponding to the difference between the first and second signals when the room is in the reference position.

9. The synchronizer of claim 7, wherein the room includes a back wall, the back wall being substantially parallel with a side wall of the vehicle when the room is in the reference position.

10. The synchronizer of claim 8, wherein the controller moves the first valve into the second position to ensure that the actuators move the room at substantially the same rate when the first and second signals indicate that the first actuator has moved in the first direction farther than the second actuator has moved in the first direction by an amount which is greater than the offset plus a predetermined tolerance.

11. The synchronizer of claim 10, wherein the controller moves the second valve into the second position to ensure that the actuators move the room at substantially the same rate when the first and second signals indicate that the second actuator has moved in the first direction farther than the first actuator has moved in the first direction by an amount which is greater than the offset plus the tolerance.

12. The synchronizer of claim 1 further including a first outer support connected to the vehicle, a first inner support connected to the room and telescopically movable within the first outer support, a second outer support connected to the vehicle, and a second inner support connected to the room and telescopically movable within the second outer support.

13. The synchronizer of claim 12, wherein the first sensor is mounted to the first outer support to measure movement of the first inner support, and the second sensor is mounted to the second outer support to measure movement of the second inner support.

14. The synchronizer of claim 12, wherein the first and second sensors are rotary sensors, the first and second signals including count pulses corresponding to a predetermined amount of movement of the first and second inner supports relative to the first and second outer supports, respectively.

15. The synchronizer of claim 14, wherein the first and second sensors each include a rotary encoder and cable wound upon a spool and having one end attached to the room, the cable being spring-biased to remain wound upon the spool, extension of the room resulting in extension of the cables, rotation of the spools, and rotation of the rotary encoders, thereby producing the first and second signals.

16. The synchronizer of claim 14, wherein the first sensor includes a pulley connected to a first rotary encoder and the first outer support and a cable extending around the pulley, the cable having one end connected to the first inner support adjacent one end of the first inner support, and the other end connected to the first inner support adjacent the other end of the first inner support such that movement of the first inner support causes movement of the cable, rotation of the pulley, rotation of the first rotary encoder, and generation of the first signal.

17. The synchronizer of claim 14, wherein the first sensor includes a rack mounted to the first inner support, and a gear connected to a first rotary encoder, the gear being mounted to the vehicle such that movement of the first inner support causes rotation of the gear by engagement with the rack, rotation of the first rotary encoder, and generation of the first signal.

18. The synchronizer of claim 14, wherein the first sensor includes a wheel connected to a first rotary encoder, the wheel being mounted to the vehicle for engagement with the first inner support such that movement of the first inner support causes rotation of the wheel, rotation of the first rotary encoder, and generation of the first signal.

19. The synchronizer of claim 12, wherein the first sensor includes a distance strip mounted to the first inner support and a reader, the reader being mounted to the vehicle adjacent the distance strip to detect movement of the distance strip as the first inner support moves, the reader generating the first signal to indicate uniform distances of movement of the first inner support.

20. The synchronizer of claim 12, wherein the first sensor includes a resistive strip mounted to the first inner support and a resistance sensor, the resistance sensor being mounted to the vehicle in contact with the resistive strip such that as the first inner support moves, the resistance sensor measures a changing resistance of the resistive strip and generates a first signal corresponding to the changing resistance.

21. The synchronizer of claim 1, wherein the controller includes a first stored first signal representing an in-stop position of the first actuator.

22. The synchronizer of claim 21, wherein the controller includes a first stored second signal representing an in-stop position of the second actuator.

23. The synchronizer of claim 21, wherein the controller moves the first valve into the second position when the first signal is equal to the first stored first signal.

24. The synchronizer of claim 23, wherein the controller moves the second valve into the second position when the second signal differs from the first signal by a predetermined amount.

25. The synchronizer of claim 21, wherein the controller includes a second stored first signal representing an out-stop position of the first actuator.

26. The synchronizer of claim 25, wherein the controller moves the first valve into the second position when the first signal is equal to the first stored first signal and when the first signal is equal to the second stored first signal.

27. The synchronizer of claim 26, wherein the controller moves the second valve into the second position when the second signal differs from the first signal by a predetermined amount.

28. The synchronizer of claim 25, wherein the controller includes a first stored second signal representing an in-stop position of the second actuator, and a second stored second signal representing an out-stop position of the second actuator.

29. The synchronizer of claim 28, wherein the controller moves the second valve into the second position when the second signal is equal to the first stored second signal and when the second signal is equal to the second stored second signal.

30. The synchronizer of claim 21 further including a set switch connected to the controller, the in-stop position being established by the controller when the set switch is actuated.

31. The synchronizer of claim 1, wherein the controller stops movement of the first actuator when the first actuator reaches an in-stop position and stops movement of the second actuator when the second actuator reaches an in-stop position.

32. The synchronizer of claim 31, wherein the controller stops movement of the first actuator when the first actuator reaches an out-stop position and stops movement of the second actuator when the second actuator reaches an out-stop position.

33. The synchronizer of claim 31, wherein the first actuator in-stop position is established by a first stop mechanism.

34. The synchronizer of claim 33 further including a first outer support connected to the vehicle, a first inner support connected to the room and telescopically movable within the first outer support by movement of the first actuator.

35. The synchronizer of claim 34, wherein the first stop mechanism includes a bracket mounted to the first inner support, the bracket engaging the first outer support at the first actuator in-stop position.

36. The synchronizer of claim 33, wherein the first stop mechanism includes a bracket mounted to the room, the bracket engaging the vehicle at the first actuator in-stop position.

37. The synchronizer of claim 33, wherein the first stop mechanism includes a nut adjustably mounted on the first actuator for engaging a bracket connected to the room, whereby adjustment of the position of the nut relative to the first actuator causes adjustment of the in-stop position of the first actuator.

38. The synchronizer of claim 33, wherein the first stop mechanism includes a sensor mounted to one of the vehicle and the room to sense the presence of the room in the retracted position.

39. The synchronizer of claim 33, wherein the first stop mechanism includes a limit switch mounted to one of the vehicle and the room, the limit switch being actuated when the room is moved into the retracted position.

40. The synchronizer of claim 33 further including a pump, the first stop mechanism including an over-current switch connected to the pump, the over-current switch being actuated by increased current drawn by the pump when the room reaches the retracted position.

41. The synchronizer of claim 1, wherein said controller includes:
   means for reading the first and second signals from the sensors;
   means for comparing said first and second signals;
   means for moving one of the first and second valves between the first and second positions when a first signal exceeds a second signal by more than a predetermined amount; and
   means for terminating the moving means.

42. The mechanism of claim 1 further including means for overriding synchronization of the actuators.

43. A synchronizer for controlling the movement of a slide-out room mounted to a vehicle, the synchronizer including:
- first and second actuators for moving the room between a retracted and an extended position, the first and second actuators being connected to the room adjacent first and second sides of the room, respectively;
- first and second sensors outputting first and second signals indicating movement of the first and second actuators, respectively;
- first and second valves connected to the first and second actuators, respectively, the first valve being adjustable between a first position wherein the first valve permits fluid flow to the first actuator to move the first side of the room in a first direction and a second position wherein the first valve inhibits fluid flow to the first actuator, the second valve being adjustable between a first position wherein the second valve permits fluid flow to the second actuator to move the second side of the room in the first direction and a second position wherein the second valve inhibits fluid flow to the second actuator; and
- a controller for adjusting the positions of the valves to ensure that the actuators move the sides of the room at substantially the same rate, the controller moving the first valve into the second position when the first signal indicates that the first side of the room has moved farther than the second side of the room by a distance which is greater than a predetermined distance, and moving the second valve into the second position when the second signal indicates that the second side of the room has moved farther than the first side of the room by a distance which is greater than the predetermined distance;
- wherein the first valve and the second valve are adjustable into a third position enabling the first actuator and the second actuator, respectively, to move in a second direction.

44. The synchronizer of claim 43 further including first and second movable supports mounted to the vehicle and connected to the room for supporting the room during movement between the extended and retracted positions, the first and second moveable supports being driven by the first and second actuators, respectively.

45. The synchronizer of claim 44, wherein the first movable support includes a first outer support connected to the vehicle and a first inner support connected to the room, and the second movable support includes a second outer support connected to the vehicle and a second inner support connected to the room.

46. The synchronizer of claim 43, wherein a relative position of the actuators is initialized by moving the room into a reference position and reading the first and second signals.

47. The synchronizer of claim 45, wherein the first sensor is mounted to the first outer support to measure movement of the first inner support, and the second sensor is mounted to the second outer support to measure movement of the second inner support.

48. The synchronizer of claim 43, wherein the first and second sensors are rotary sensors, the first and second signals including count pulses corresponding to a predetermined amount of movement of the first and second inner supports relative to the first and second outer supports, respectively.

49. The synchronizer of claim 43, wherein the controller includes a first stored first signal representing an in-stop position of the first actuator.

50. The synchronizer of claim 49, wherein the controller includes a first stored second signal representing an in-stop position of the second actuator.

51. The synchronizer of claim 49, wherein the controller moves the first valve into the second position when the first signal is equal to the first stored first signal.

52. The synchronizer of claim 51, wherein the controller moves the second valve into the second position when the second signal differs from the first signal by a predetermined amount.

53. The synchronizer of claim 43, wherein the controller stops movement of the first actuator when the first actuator reaches an in-stop position and stops movement of the second actuator when the second actuator reaches an in-stop position.

54. The synchronizer of claim 53, wherein the first actuator in-stop position is established by a first stop mechanism.

55. A method for synchronizing the movement of a slide-out room between a retracted position substantially within a vehicle and an extended position extended from the vehicle, the method including the steps of:
- storing a left in-stop position corresponding to the position left actuator and a right in-stop position corresponding to the position of the right actuator when the room is in the retracted position;
- actuating left and right actuators connected to the room for driving the room between the retracted and extended positions;
- generating first signals representing movement of the left actuator and second signals representing movement of the right actuator;
- interrupting operation of the left actuator when the first signals indicate that the left actuator leads the right actuator by a distance which is greater than a predetermined distance;
- interrupting operation of the right actuator when the second signals indicate that the right actuator leads the left actuator by a distance which is greater than the predetermined distance; and
- disabling the first of the left and right actuators to reach the corresponding in-stop position, and continuing to actuate the other of the left and right actuators until the distance between the actuators is greater than or equal to the predetermined distance.

56. The method of claim 55 further including the step of storing left and right out-stop positions corresponding to the positions of the left and right actuators, respectively, when the room is in the extended position.

* * * * *